US011892791B2

(12) United States Patent
Mizukoshi et al.

(10) Patent No.: US 11,892,791 B2
(45) Date of Patent: Feb. 6, 2024

(54) IMAGE FORMING APPARATUS

(71) Applicant: CANON KABUSHIKI KAISHA, Tokyo (JP)

(72) Inventors: Shunsuke Mizukoshi, Tokyo (JP); Kazunari Hagiwara, Kanagawa (JP); Shoko Funaki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/989,047

(22) Filed: Nov. 17, 2022

(65) Prior Publication Data

US 2023/0152739 A1 May 18, 2023

(30) Foreign Application Priority Data

Nov. 18, 2021 (JP) ................................. 2021-188232

(51) Int. Cl.

*G03G 15/00* (2006.01)
*G03G 15/16* (2006.01)
*G03G 21/00* (2006.01)

(52) U.S. Cl.

CPC ....... *G03G 15/5008* (2013.01); *G03G 15/161* (2013.01); *G03G 15/1615* (2013.01); *G03G 21/0035* (2013.01)

(58) Field of Classification Search

CPC ............. G03G 15/5008; G03G 15/161; G03G 15/1615; G03G 21/0035

See application file for complete search history.

(56) References Cited

U.S. PATENT DOCUMENTS 8,843,032 B2 9/2014 Kubo
2012/0230710 A1* 9/2012 Gomi ................ G03G 15/0266 399/50
2019/0369539 A1* 12/2019 Park ...................... G03G 15/55

FOREIGN PATENT DOCUMENTS

JP 2011-123439 A 6/2011
JP 2012-163601 A 8/2012
JP 2013-217987 A 10/2013

* cited by examiner

*Primary Examiner* — Stephanie E Bloss
*Assistant Examiner* — Michael A Harrison
(74) *Attorney, Agent, or Firm* — Venable LLP

(57) ABSTRACT

An image forming apparatus includes a rotatable photosensitive member; a charging portion, an exposure portion, a developing member, a transfer unit, a contact and separation portion, a charging voltage applying portion, a detecting portion, and a controller. The controller is capable of executing an operation in an image forming mode and an operation in a detecting mode. The controller carries out control so that a charging current flowing through a charging portion during charging of the photosensitive member in the operation in the detecting mode is lower than a charging current flowing through the charging portion during charging of the photosensitive member in the operation in the image forming mode.

27 Claims, 11 Drawing Sheets

IMAGE FORMING APPARATUS

FIELD OF THE INVENTION AND RELATED ART

The present invention relates to an image forming apparatus, such as a copying machine, a printer, or a facsimile machine, of an electrophotographic type or an electrostatic recording type.

Conventionally, in the image forming apparatus of the electrophotographic type, a surface of a rotatable photosensitive member as an image bearing member (hereinafter, referred to as a "photosensitive drum" as an example) is electrically charged uniformly, and the charged surface of the photosensitive drum is exposed to light depending on image information, so that an electrostatic latent image is formed on the photosensitive drum. Then, the electrostatic latent image formed on the photosensitive drum is developed by being supplied with toner as a developer by a developing device, so that a toner image is formed on the photosensitive drum.

Further, conventionally, there is an image forming apparatus of a tandem type in which a plurality of image forming portions each including the photosensitive drum and in which toner images different in color are formed in the image forming portions. The toner images formed on the photosensitive drums of the image forming portions are successively primary-transferred superposedly onto an intermediary transfer member (hereinafter, referred to as an "intermediary transfer belt" as an example) and then are secondary-transferred onto a recording material such as paper. Or, the toner images formed on the photosensitive drums of the image forming portions are successively transferred onto the recording material such as paper carried on a recording material carrying member so as to be directly superposed. In the following, as the image forming apparatus of the tandem type, principally, an image forming apparatus of an intermediary transfer type using the intermediary transfer belt is used as an example.

As one of developing types in the image forming apparatuses described above, there is a contact development type. The contact development type is such that a rotatable developing member (hereinafter, referred to as "developing roller" as an example) is contacted to the surface of the photosensitive drum and toner is supplied from the developing roller to the electrostatic latent image formed on the photosensitive drum. The developing device is provided with a contact member contacting the developing roller is some instances. As an example of the contact member, it is possible to cite a supplying member such as a supplying roller for supplying the toner to the developing roller and a regulating member such as a regulating blade for regulating a thickness of a toner layer formed on the developing roller.

Here, when the developing roller is rotated, abrasion of the developing roller and the contact member and deterioration of the toner occur in some instances. Accordingly, it is preferable that rotational drive of the developing roller is carried out only when necessary and the developing roller is separated from the photosensitive drum in a period other than the necessary period, and the rotational drive of the developing roller is stopped. Further, in the case where the developing roller is contacted to the photosensitive drum, for example, the rotational drive of the photosensitive drum is started and the photosensitive drum surface is charged, and then the developing roller is contacted to the photosensitive drum. Further, for example, immediately before the developing roller contacts the photosensitive drum, the rotational drive of the developing roller is started. By this, it is possible to suppress the abrasion of the developing roller and the contact member or the deterioration of the toner. For that purpose, a contact and separation mechanism capable of moving the developing roller to a contact position where the developing roller is contacted to the photosensitive drum and a separated position where the developing roller is separated from the photosensitive drum is provided in some instances.

Further, conventionally, there is a system in which toner remaining on the photosensitive drum after a transfer step (hereinafter, referred to as "transfer residual toner" is collected without providing a special cleaning device for removing the transfer residual toner (hereinafter, this system is referred to as a "cleaner-less system"). In a constitution employing the cleaner-less system, the transfer residual toner and toner re-transferred onto the photosensitive drum (hereinafter, referred to as "re-transfer toner") are deposited on a charging member, an auxiliary charging member, and the like in some cases. Incidentally, as the charging member, a charging roller contacting the surface of the photosensitive drum is used in many cases. Further, as the auxiliary charging member, a roller or a brush which contact the surface of the photosensitive drum after the transfer step and before a charging step is used, and a bias is applied thereto in some instances. Further, the "re-transfer") is a phenomenon such that in the image forming apparatus of the tandem type, a part of the toner transferred on the intermediary transfer belt in an upstream-side image forming portion with respect to a rotational direction of the intermediary transfer belt is moved to a photosensitive drum of a downstream-side image forming portion with respect to the rotational direction. Further, in such a constitution, in order to maintain an image quality, a refresh operation such that the toner deposited on the charging roller or the auxiliary charging member is discharged on the photosensitive drum and is collected by being transferred from the photosensitive drum onto the intermediary transfer belt or the like is performed in some cases. During this refresh operation, in order to suppress "color mixing" by re-transfer toner, there is a need to separate the developing roller from the photosensitive drum so that the toner discharged from the developing roller or the like to the photosensitive drum is not collected by the developing device in some instances. Thus, there is an operation regulating separation of the developing roller from the photosensitive drum in addition to suppression of the deterioration of the above-described members and toner.

On the other hand, in the above-described constitution including the contact and separation mechanism, there is a possibility that an operation in which the developing roller is separated from the photosensitive drum (hereinafter, referred to as a "separating operation" is not normally performed and thus the developing roller is not separated from the photosensitive drum. In the case where abnormality of such a separating operation (hereinafter, referred to as "separation abnormality") occurs, for example, in a period from a start of the rotational drive of the photosensitive drum until rotational drive of the developing roller is started, only the photosensitive drum is rotationally driven in a state in which the developing roller and the photosensitive drum are in contact with each other. As a result, friction generates between the photosensitive drum and the developing roller and a torque required to rotationally drive the photosensitive drum is increased by a friction resistance generated at that time, so that component parts relating to motors and transmission of a driving force are consumed more than necessary in some instances. In such a situation, when use of the image forming apparatus is continued and the consumption of the parts more than necessary is repeated, there is a possibility that breakage and an out of order condition of these parts are induced. Further, in the case where the separation abnormality occurs, there is a possibility that the operation, such as the refreshing operation, requiring the separation of the developing roller from the photosensitive drum cannot be properly performed.

In U.S. Patent Application Publication No. US2019/0369539 A1, a method of discriminating whether or not the separation abnormality occurred by utilizing the observation that an electrostatic latent image for a test pattern formed on the photosensitive drum is not developed when the developing roller is in the separated position and is developed when the developing roller is in the contact position is disclosed.

However, in the constitution employing the cleaner-less system, when an operation for detecting whether or not the above-described separation abnormality occurred (hereinafter, referred to as a separation abnormality detecting operation) is performed, an "image flow" is liable to occur in some cases. This would be considered due to the following reason.

That is, on the surface of the photosensitive drum, an electric discharge product is deposited principally due to electric discharge during charging of the photosensitive drum surface by the charging roller. It has been known that this electric discharge product is lowered in resistance in a high-humidity environment. Further, when the electric discharge product accumulates on the photosensitive drum surface, due to the low resistance of the above-described electric discharge product, an image defect called the "image flow" such that the electrostatic latent image is disturbed occurs in some instance. In the constitution employing the cleaner-less system, a special cleaning member such as a cleaning blade with which the photosensitive drum surface is rubbed is not provided, and therefore, the electric discharge product is liable to accumulate on the photosensitive drum surface.

On the other hand, during development, the developing roller is contacted to the photosensitive drum, whereby the electric discharge product on the photosensitive drum surface is removed, so that occurrence of the "image flow" can be suppressed. However, during the separation abnormality detecting operation, particularly in the case where the separating operation is normally performed, formation of an electrostatic latent image for a test pattern including the charging of the photosensitive drum surface is made in a state in which the developing roller is in the separated position. In this case, the electric discharge product cannot be removed from the photosensitive drum and is accumulated on the photosensitive drum surface, thus causing the occurrence of the "image flow" in some cases. Thus, there is a contradictory problem such that it is desired that the abnormality of the separating operation is detected by the separation abnormality detecting operation, while the "image flow" is liable to occur when the operation including the charging of the photosensitive drum surface is performed in the state in which the developing roller is in the separated position.

Further, in the case where the cleaner-less system is employed in the image forming apparatus of the tandem type, depending on a process condition during the separation abnormality detecting operation, the "color mixing" is liable to occur in some instances. This is because a part of a toner image for a test pattern transferred on the intermediary transfer belt in the upstream-side image forming portion with respect to the rotational direction of the intermediary transfer belt is deposited on the photosensitive drum of the downstream-side image forming portion with respect to the rotational direction and then is collected by the developing device.

SUMMARY OF THE INVENTION

A principal object of the present invention is to provide an image forming apparatus capable of suppressing occurrences of inconveniences such as an "image flow" and "color mixing" caused due to execution of a separation abnormality detecting operation.

The object has been accomplished by the image forming apparatus according to the present invention.

According to an aspect of the present invention, there is provided an image forming apparatus comprising: a rotatable photosensitive member; a charging portion configured to electrically charge a surface of the photosensitive member; an exposure portion configured to expose the charged surface of the photosensitive member to light to form an electrostatic latent image on the photosensitive member; a developing member configured to develop the electrostatic latent image on the photosensitive member with toner into a toner image in contact with the surface of the photosensitive member; a transfer unit configured to transfer the toner image from the photosensitive member onto a toner image receiving member in a transfer portion; a contact and separation portion configured to move the developing member to a contact position where the developing member contacts the surface of the photosensitive member and a separated position where the developing member is separated from the surface of the photosensitive member; a charging voltage applying portion configured to apply, to the charging portion, a charging voltage for charging the photosensitive member; a detecting portion configured to detect the toner image, formed on the photosensitive member, on the photosensitive member or the toner image receiving member; and a controller capable of controlling the contact and separation portion, the charging voltage applying portion, and the exposure portion, wherein toner remaining on the photosensitive member without being transferred onto the toner image receiving member is collected by the developing member, wherein the controller is capable of executing: an operation in an image forming mode in which the controller carries out control so that the toner image to be formed on a recording material as the toner image receiving member or a recording material onto which the toner image is transferred from the toner image receiving member is formed, and an operation in a detecting mode in which the controller carries out control so that a predetermined instruction to position the developing member in the separated position is sent to the contact and separation portion and an electrostatic latent image for a test pattern is formed on the photosensitive member and then so that in a case that the developing member is positioned in the contact position in accordance with the predetermined instruction without being positioned in the separated position, a toner image for the test pattern formed by developing the electrostatic latent image for the test pattern with toner is detected by the detecting portion, and wherein the controller carries out control so that a charging current flowing through the charging portion during charging of the photosensitive member in the operation in the detecting mode is lower than a charging current flowing through the charging portion during charging of the photosensitive member in the operation in the image forming mode.

According to another aspect of the present invention, there is provided an image forming apparatus comprising: first and second image forming portions each including a rotatable photosensitive member, a charging portion configured to electrically charge a surface of the photosensitive member, and the developing member configured to develop an electrostatic latent image on the photosensitive member with toner into a toner image in contact with a surface of the photosensitive member; an exposure portion configured to expose the charged surface of the photosensitive member of each of the first and second image forming portions to light to form the electrostatic latent image on the photosensitive member of each of the first and second image forming portions; an intermediary transfer member which is configured to form a transfer portion in contact with the surface of the photosensitive member of each of the first and second image forming portions and to convey the toner image transferred from the photosensitive member in the transfer portion of each of the first and second image forming portions, for being secondary-transferred onto a recording material in a secondary transfer portion and which is rotatable in a predetermined rotational direction; a contact and separation portion configured to move the developing member of each of the first and second image forming portions to a contact position in which the developing member contacts the surface of the photosensitive member of each of the first and second image forming portions and a separated position where the developing member is separated from the surface of the photosensitive member of each of the first and second image forming portions; a charging voltage applying portion configured to apply, to the charging portion of each of the first and second image forming portions, a charging voltage for charging the photosensitive member; a transfer voltage applying portion configured to apply, to the transfer portion of each of the first and second image forming portions, a transfer voltage for transferring the toner image from the photosensitive member; a detecting portion configured to detect the toner image, formed on the photosensitive member, on the photosensitive member or the intermediary transfer member; and a controller capable of controlling the contact and separation portion, the charging voltage applying portion, the transfer voltage applying portion, and the exposure portion, wherein toner remaining on the photosensitive member without being transferred onto the intermediary transfer member is collected by the developing member, and with respect to the rotational direction, the photosensitive member of the second image forming portion is positioned downstream of the first image forming portion and upstream of the secondary transfer portion, wherein the controller is capable of executing: an operation in an image forming mode in which the controller carries out control so that the toner image to be formed on the recording material in each of the first and second image forming portions is formed, and an operation in a detecting mode in which the controller carries out control so that a predetermined instruction to position the developing member in the separated position is sent to the contact and separation portion in each of the first and second image forming portions and an electrostatic latent image for a test pattern is formed on the photosensitive member in each of the first and second image forming portions and then so that in a case that the developing member in at least one of the first and second image forming portions is positioned in the contact position in accordance with the predetermined instruction without being positioned in the separated position under application of the transfer voltage to the transfer portion when a region of the test pattern on the surface of the photosensitive member contacts the intermediary transfer member in each of the first and second image forming portions, a toner image for the test pattern formed by developing the electrostatic latent image for the test pattern with toner is detected by the detecting portion, wherein in the operation in the detecting mode, the region of the test pattern on the surface of the photosensitive member of the first image forming portion is defined as a first region, the region of the test pattern on the surface of the photosensitive member of the second image forming portion is defined as a second region, a region on a surface of the intermediary transfer member contacting the first region is defined as a third region, and a region on the surface of the intermediary transfer member contacting the second region is defined as a fourth region, wherein the controller carries out control so that the third region and the fourth region do not overlap with each other, and wherein the controller carries out control so that in the second image forming portion, an absolute value of a difference between a potential of a non-image portion on the photosensitive member and a potential of the transfer voltage in the operation in the detecting mode is smaller than an value of a difference between a potential of the non-image portion on the photosensitive member and a potential of the transfer voltage in the operation in the image forming mode.

Further features of the present invention will become apparent from the following description of exemplary embodiments with reference to the attached drawings.

Figure 6:
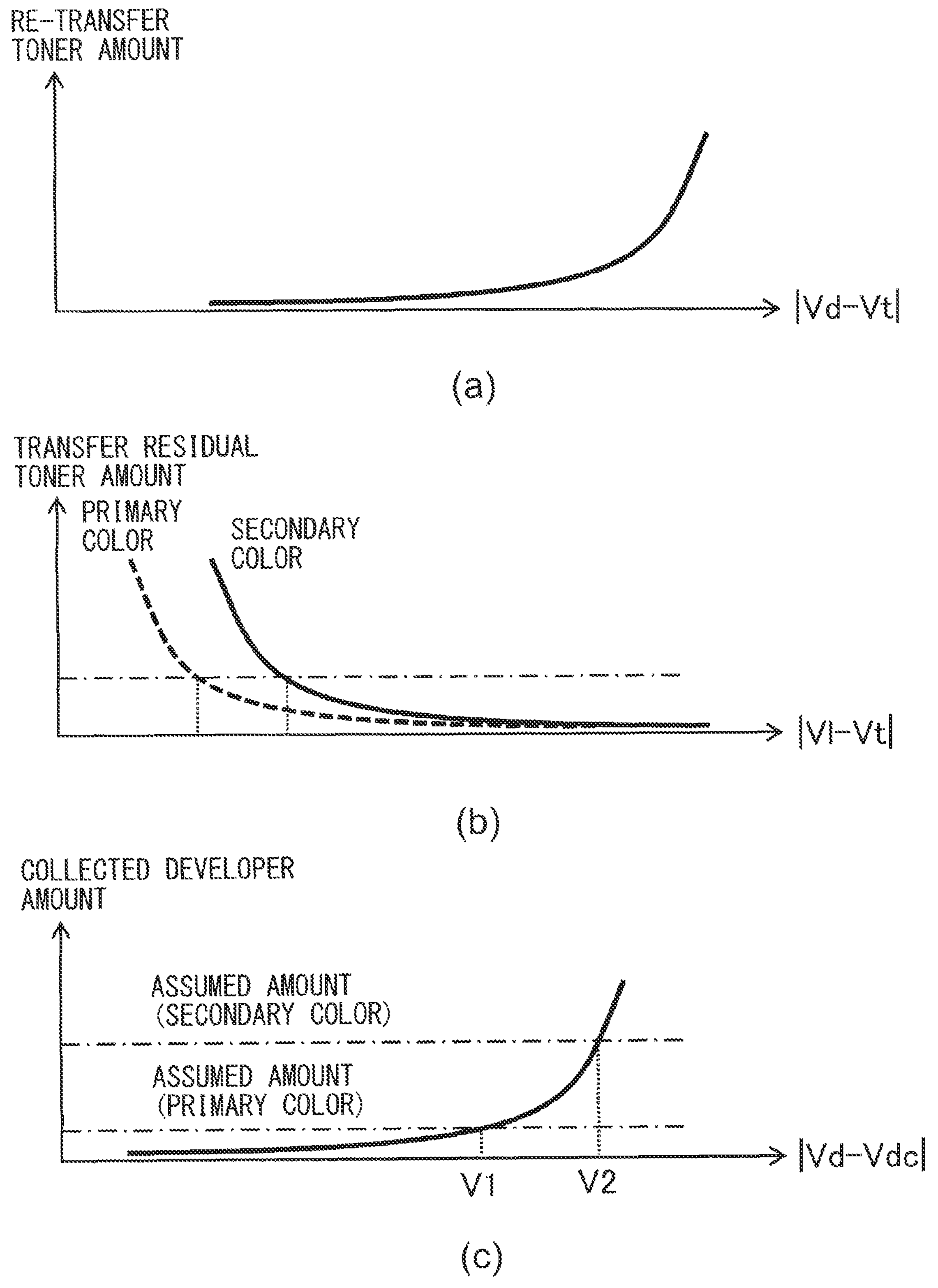

Parts (a), (b) and (c) of FIG. 6 are graphs for illustrating a re-transfer toner amount, a transfer-residual toner amount, and a collected developer amount, respectively.

Figure 7:
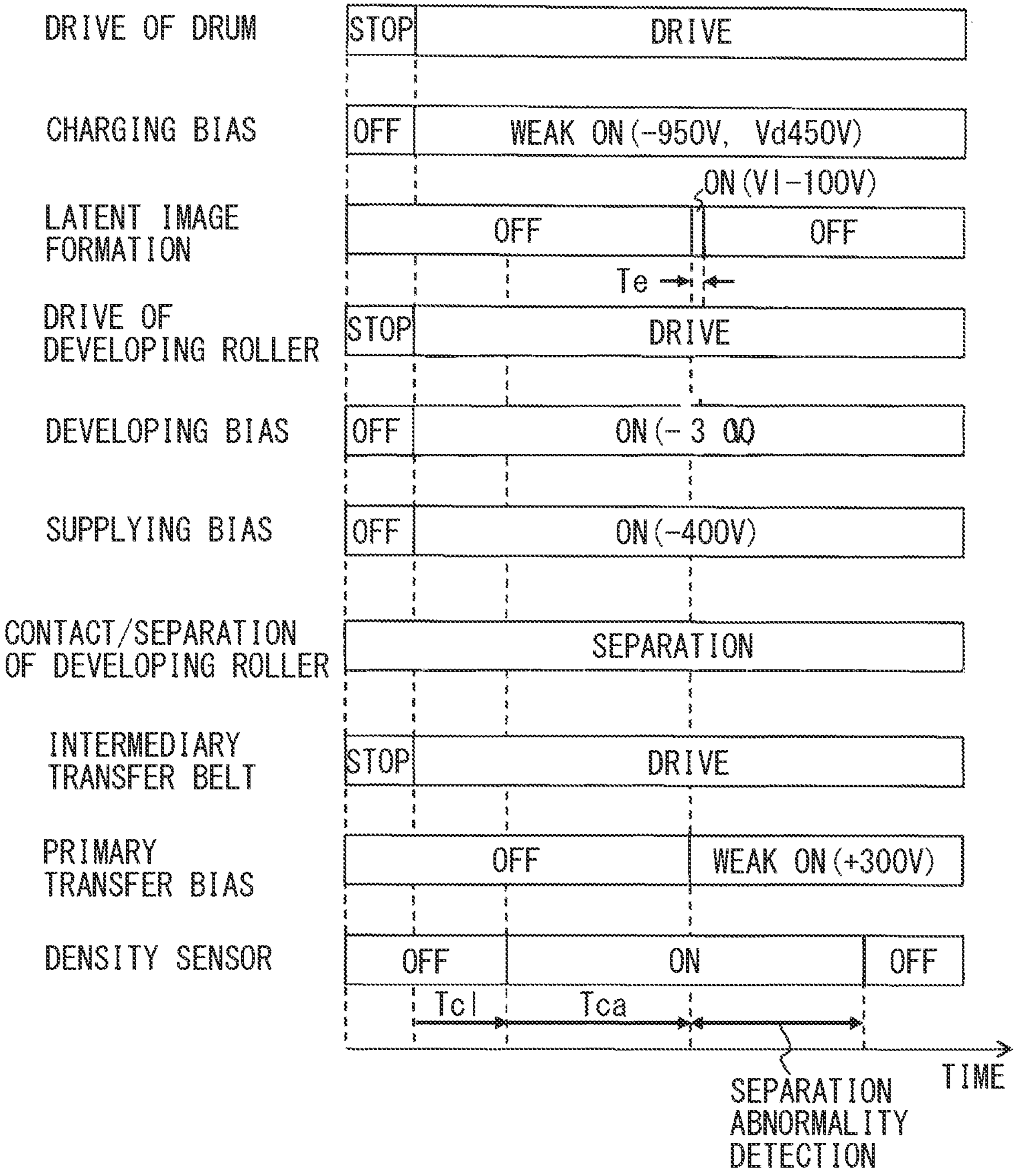

FIG. 7 is a timing chart showing an outline of the procedure of the separation abnormality detecting operation.

Figure 8:
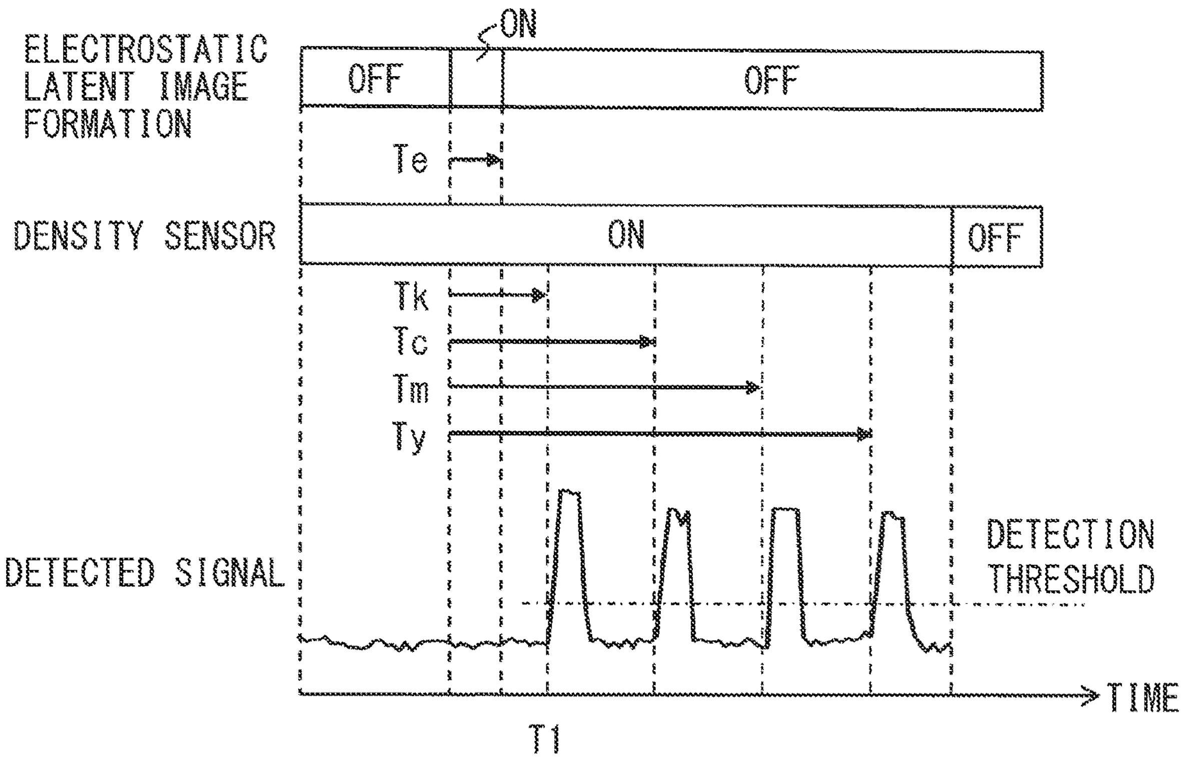

FIG. 8 is a timing chart for illustrating a test pattern detecting operation.

Figure 9:
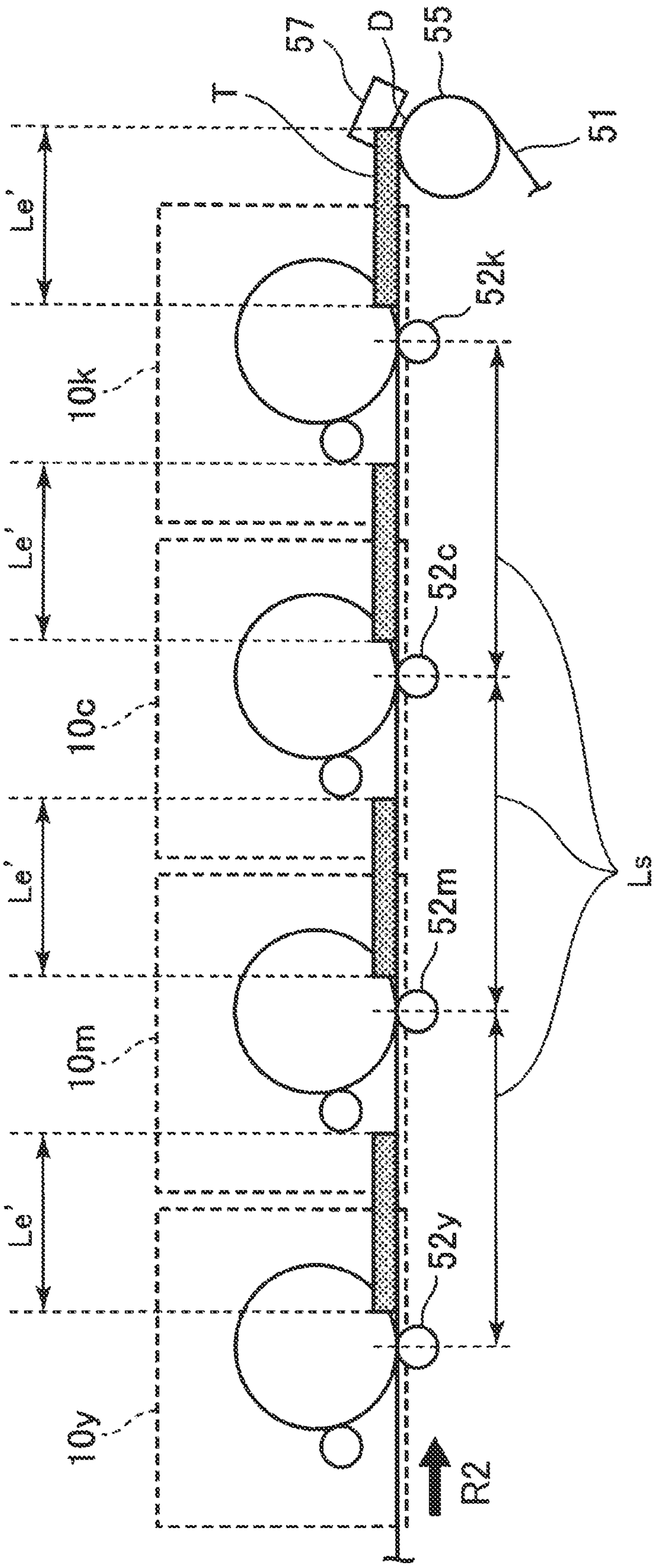

FIG. 9 is a schematic view for illustrating a timing for forming a test pattern.

Figure 10:
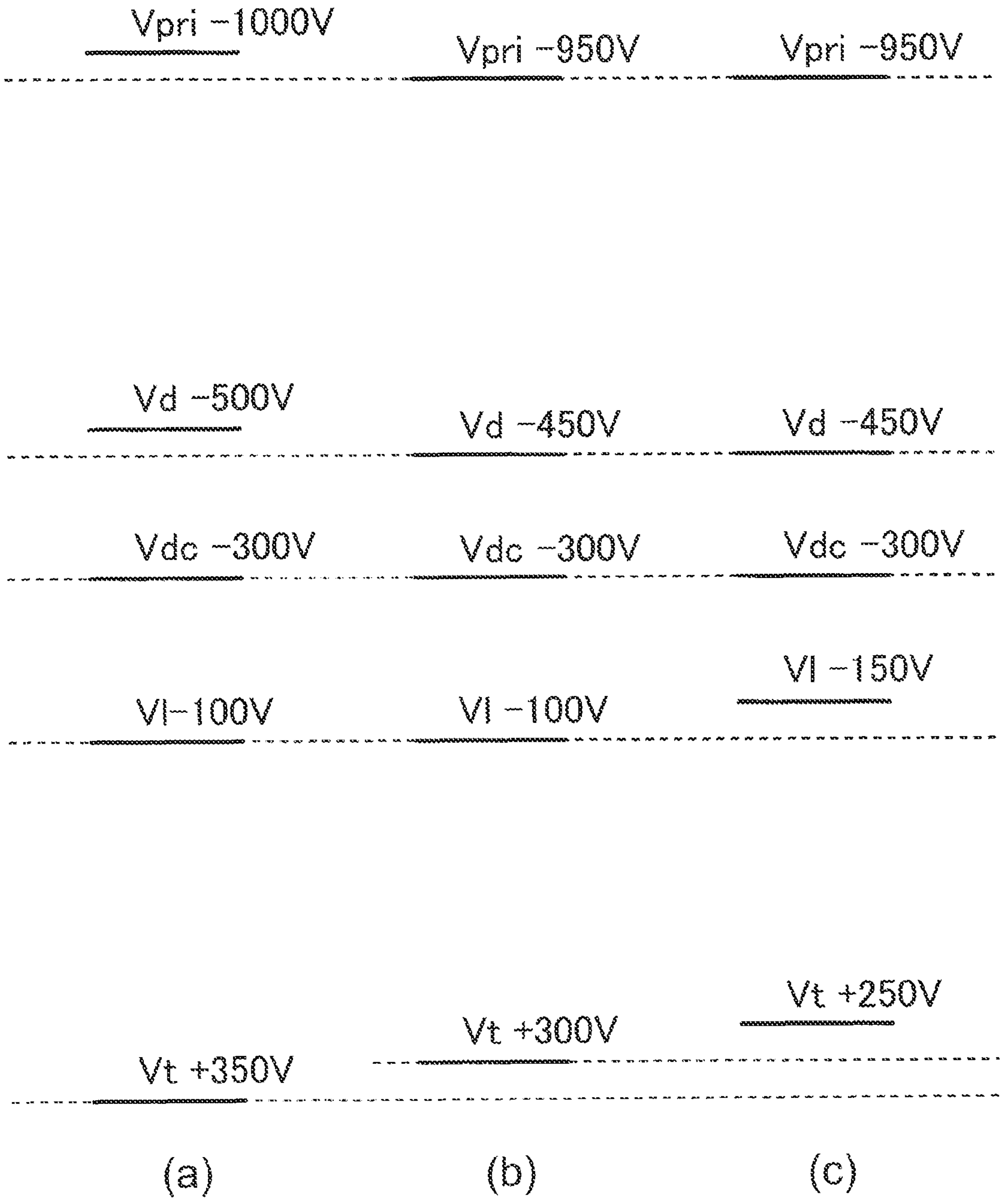

Parts (a), (b) and (c) of FIG. 10 are schematic views for illustrating a bias setting in the separation abnormality detecting operation.

Figure 11:
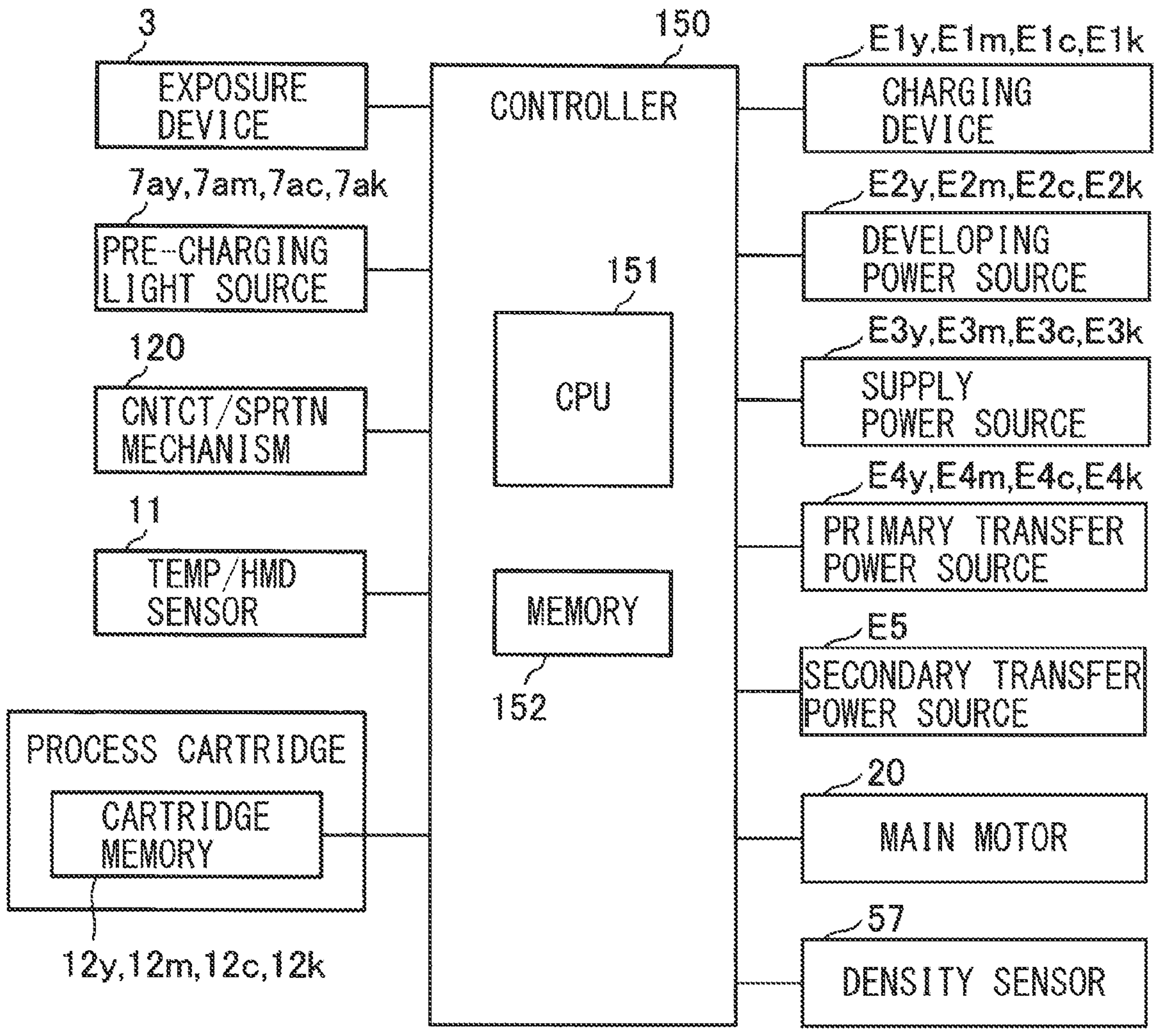

FIG. 11 is a schematic block diagram showing a control mode of a principal part of an image forming apparatus.

DESCRIPTION OF THE EMBODIMENTS

In the following, an image forming apparatus according to the present invention will be described with reference to the drawings.

Embodiment 1

1. General Structure and Operation of Image Forming Apparatus

Figure 1:
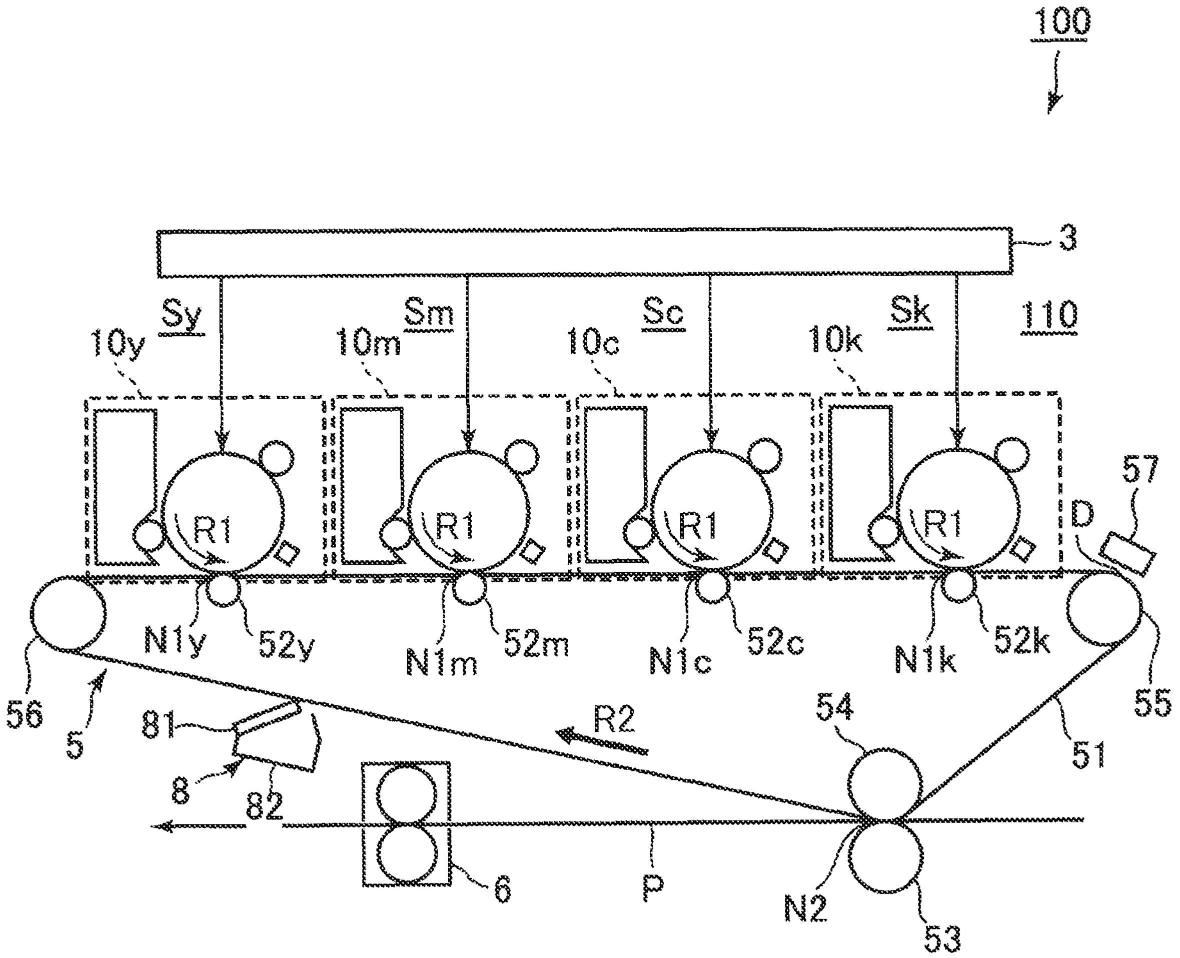
FIG. 1 is a schematic sectional view of an image forming apparatus.

FIG. 1 is a schematic sectional view of an image forming apparatus 100 of an embodiment 1. The image forming apparatus of this embodiment is a tandem-type printer employing an intermediary transfer type process capable of forming a full-color image with use of an electrophotographic type system.

The image forming apparatus 100 includes, as a plurality of image forming portions (stations), four image forming portions Sy, Sm, Sc and Sk for forming toner images of yellow (Y), magenta (M), cyan (C) and black (K), respectively. As regards elements in the image forming portions Sy, Sm, Sc and Sk having the same or corresponding functions or constitutions, suffixes y, m, c and k of reference numerals or symbols showing the elements each for the associated color are omitted and collectively described in some instances.

Figure 2:
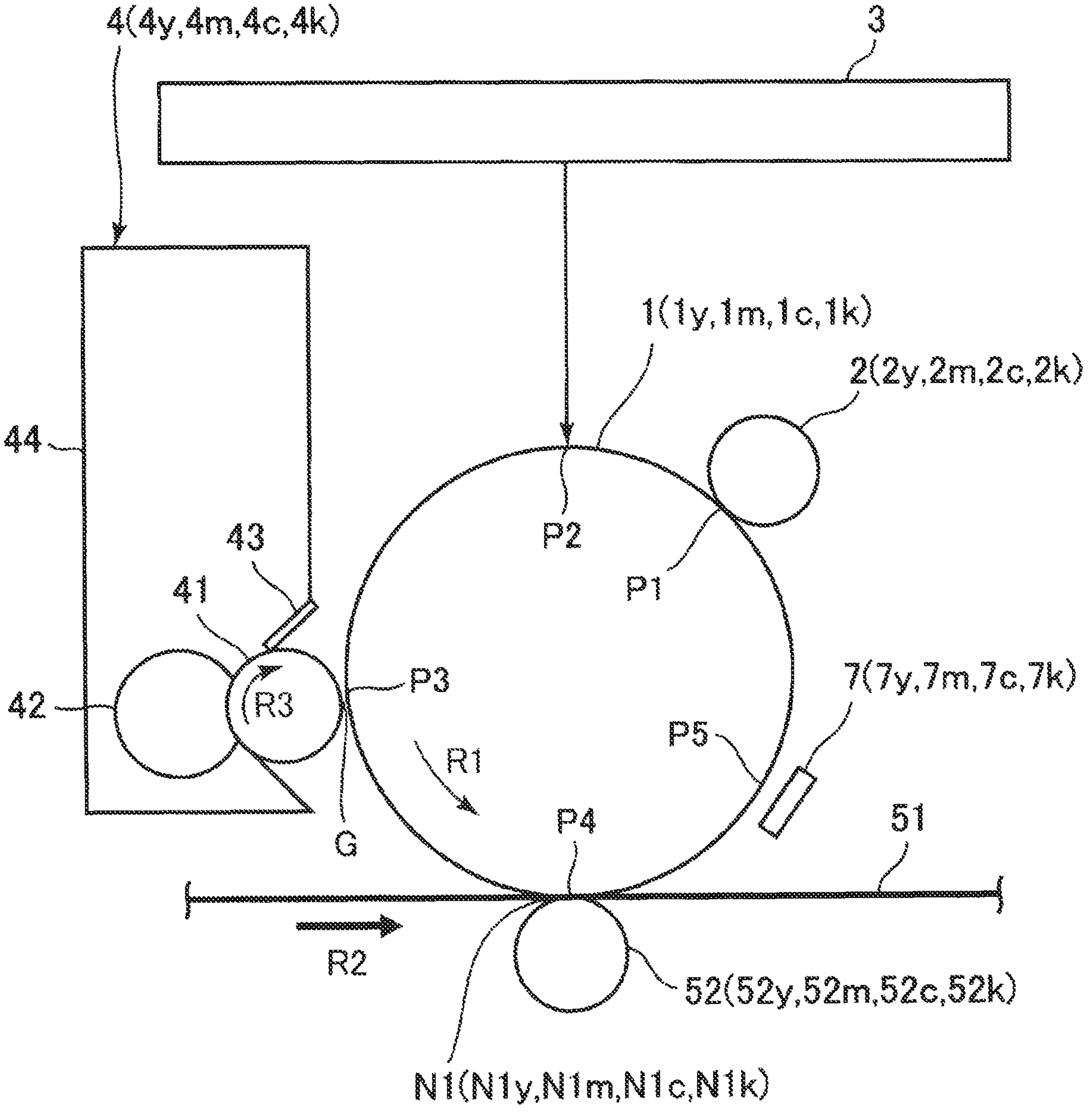
FIG. 2 is a schematic sectional view of an image forming portion.

FIG. 2 is a schematic sectional view showing a single image forming portion S as a representative example. In this embodiment, the image forming portion S is constituted by including a photosensitive drum 1, a charging roller 2, an exposure device 3, a developing device 4, a pre-charging exposure device 7, and a primary transfer roller 52, which are described later. Incidentally, in this embodiment, the exposure device 3 is constituted as a single unit capable of exposing, to light, the photosensitive drum 1 of each of the respective image forming portions S.

In each image forming portion S, the photosensitive drum 1 and, as process means actable thereon, the charging roller 2, the exposure device 3, and the developing device 4, and the pre-charging exposure device 7 integrally constitute a process cartridge 10 detachably mountable to an apparatus main assembly 110 of the image forming apparatus 100. Each of the process cartridges 10*y*, 10*m*, 10*c* and 10*k* executes at least a part of an image forming operation in a mounted state in the apparatus main assembly 110. The process cartridges 10*y*, 10*m*, 10*c* and 10*k* store toners of yellow, magenta, cyan and black, respectively. The process cartridges 10*y*, 10*m*, 10*c* and 10*k* have substantially the same constitution except that the colors of the toners are different from each other. In this embodiment, the process cartridge 10 includes the photosensitive drum 1 which is a rotatable drum-type (cylindrical) photosensitive member (electrophotographic photosensitive member) as an image bearing member. Further, this process cartridge 10 includes the charging roller 2 which is a roller-shaped charging member as a charging means (charging portion), the developing device 4 as a developing means, and the pre-charging exposure device 7 as a charge-removing means (pre-charging exposure portion). The pre-charging exposure device 7 guides light emitted from a light source 7*a* (FIG. 3) provided in the apparatus main assembly 110 and irradiates the surface of the photosensitive drum 1 with the light. Incidentally, the light source 7*a* of the pre-charging exposure device 7 may be provided on the process cartridge 10. The developing device 4 includes a developing container 44 in which a negative-chargeable non-magnetic one-component developer ("toner") having a surface on which an external additive is deposited is stored. Further, the developing device 4 includes a rotatable developing roller 41 as a developing member (developer carrying member), a supplying roller 42 as a supplying member, and a regulating blade 43 as a regulating member. The supplying roller 42 is a roller including an elastic layer constituted by a foam member capable of incorporating the toner and supplies the toner to the surface of the developing roller 41 by being rotated while contacting the developing roller 41.

The developing roller 41 is movable to a contact position where the developing roller 41 contacts the photosensitive drum 1 and a separated position where the developing roller 41 is separated from the photosensitive drum 1 by a contact and separation mechanism 120 (FIG. 4) described later. Whether the developing roller 41 is disposed in the contact position or the separated position by the contact and separation mechanism 120, i.e., a contact and separation state of the developing roller 41 relative to the photosensitive drum 1 is controlled by a predetermined instruction sent from a controller 150 described later to the contact and separation mechanism 120. In this embodiment, as regards the developing roller 41, a state in which the developing roller 41 is separated from the photosensitive drum 1 is a home position. That is, the developing roller 41 is separated from the photosensitive drum 1 during a stop of the operation of the image forming apparatus 100 (stand-by state in which the image forming apparatus 100 waits for a print job (described later) or power-off state) or the like. Further, during a developing step, the developing roller 41 contacts the surface of the photosensitive drum 1 and forms a developing portion (developing nip) G which is a contact portion between itself and the photosensitive drum 1.

Further, the image forming apparatus 100 includes an intermediary transfer belt unit (transfer device) 5 so as to oppose the four photosensitive drums 1*y*, 1*m*, 1*c* and 1*k*. The intermediary transfer belt unit 5 includes, as a plurality of stretching rollers (supporting rollers), a secondary transfer opposite roller (inner secondary transfer roller, turn roller) 54, a driving roller 55, and a tension roller 56. Further, the intermediary transfer belt unit 5 includes an intermediary transfer belt 51 which is a flexible endless belt-like intermediary transfer member stretched by the plurality of stretching rollers 54 to 56. The intermediary transfer belt 51 is rotated (circulated and moved, circumferentially moved) in an arrow R2 direction (clockwise direction) in FIG. 1 by rotationally moving the driving roller 55 by a driving force transmitted from a main motor 20 (FIG. 3) as a driving means. Further, on an inner peripheral surface side of the intermediary transfer belt 51, primary transfer rollers 52*y*, 52*m*, 52*c* and 52*k* which are roller-shaped primary transfer members as primary transfer means are provided correspondingly to the photosensitive drums 1*y*, 1*m*, 1*c* and 1*k*, respectively. The primary transfer roller 52 is pressed toward the photosensitive drum 1 and is contacted to the intermediary transfer belt 51 toward the photosensitive drum 1 and forms a primary transfer portion (primary transfer nip) N1 which is a contact portion between the photosensitive drum 1 and the intermediary transfer belt 51.

The primary transfer roller 52 constitutes the intermediary transfer belt unit 5. On an outer peripheral surface side of the intermediary transfer belt 51, in a position opposing the secondary transfer opposite roller 54 through the intermediary transfer belt 51, a secondary transfer roller (outer secondary transfer roller) 53 which is a roller-shaped secondary transfer member as a secondary transfer means is provided. The secondary transfer roller 53 is pressed toward the secondary transfer opposite roller 54 and is contacted to the intermediary transfer belt 51 toward the secondary transfer opposite roller 54 and forms a secondary transfer portion (secondary transfer nip) N2 which is a contact portion between the intermediary transfer belt 51 and the secondary transfer roller 53.

A rotational direction (circulatory movement direction, surface movement direction, feeding direction) of the intermediary transfer belt 51 shown by the arrow R2 in FIG. 1 is hereinafter simply referred to as a "belt feeding direction R2". With respect to the belt feeding direction R2, the process cartridge 10*y* for yellow is positioned on a most upstream side (on a side downstream of the secondary transfer portion N2). With respect to the belt feeding direction R2, the process cartridge 10$m$ for magenta is positioned downstream of the process cartridge 10$y$, the process cartridge 10$c$ for cyan is positioned downstream of the process cartridge 10$m$, and the process cartridge 10$k$ for black is positioned downstream of the process cartridge 10$c$. Further, with respect to the belt feeding direction R2, of the four process cartridges 10, the process cartridge 10$k$ for black is positioned on a most downstream side (on a side upstream of the secondary transfer portion N2). Further, with respect to the belt feeding direction R2, the secondary transfer portion N2 is positioned downstream of the primary transfer portions N1$y$, N1$m$, N1$c$ and N1$k$ (on a side downstream of the most downstream primary transfer portion N1$k$ and upstream of the most upstream primary transfer portion N1$y$).

An image forming process of the image forming apparatus 100 of this embodiment will be described. When image forming information on a print job (described later) such as image information (image signal) is sent from an external device such as a personal computer to a controller 150 described later, the controller 150 causes the image forming apparatus 100 to start the image forming process. First, drive of a main motor 20 (FIG. 3) as a driving means is started, so that rotation of the photosensitive drums 1 and rotation of the intermediary transfer belt 51 by the main motor 20 are started substantially at the same time.

In this embodiment, at that time, in interrelation with the rotation of the photosensitive drums 1, rotations of the developing rollers 41 and the supplying rollers 42 of the corresponding developing devices 4 are started. In this embodiment, in each developing device 4, the developing roller 41 and the supplying roller 42 are rotationally driven by transmission of a driving force transmitted from the main motor 20 to the photosensitive drum 1 in a branch manner. By this, the photosensitive drum 1 is rotated in an arrow R1 direction (counterclockwise direction) in FIG. 1. Further, the intermediary transfer belt 51 is rotated in the arrow R2 direction (clockwise direction) in FIG. 1. Further, the developing roller 41 is rotated in an arrow R2 direction (clockwise direction) in FIG. 2. In this embodiment, the developing roller 41 is rotated relative to the photosensitive drum 1 with a predetermined peripheral speed ratio (in this embodiment, a peripheral speed of the developing roller 41 is faster than a peripheral speed of the photosensitive drum 1). Substantially simultaneously with the start of the drive of the main motor 20, application of a charging bias (charging voltage) of −1000 V to the charging roller 2 by a charging power source (high-voltage power source) E1 (FIG. 3) as a charging voltage applying portion is started. By this, the surface of the photosensitive drum 1 is charged substantially uniformly by the charging roller 2, so that a dark portion potential Vd of −500 V is formed on the surface of the photosensitive drum 1. Here, a position where the photosensitive drum 1 is charged by the charging roller 2 with respect to the rotational direction of the photosensitive drum 1 is a charging position P1. In this embodiment, the charging roller 2 charges the surface of the photosensitive drum 1 by utilizing electric discharge generating in at least one of small gaps on sides upstream and downstream of the contact portion between the charging roller 2 and the photosensitive drum 1 with respect to the rotational direction of the photosensitive drum 1. However, for simplification, it may be considered that the position on the photosensitive drum 1 contacting the charging roller 2 is regarded as the charging position P1.

Further, when the image forming process is started, an operation in which the developing roller 41 is contacted to the photosensitive drum 1 by the contact and separation mechanism 120 (hereinafter, this operation is simply referred to as a "contact operation") is performed. In this embodiment, the contact operation is performed so that the developing roller 41 contacts the photosensitive drum 1 at a timing when the surface of the photosensitive drum 1 appropriately charged by the charging roller 2 passes through a position (developing position P3 described later) closest to the developing roller 41 of the developing device 4 and a laser timing (in this embodiment, substantially at the same time as this timing).

The uniformly charged surface of the photosensitive drum 1 is exposed to light by being irradiated with a laser beam emitted depending on the image information (image signal) from the exposure device (laser scanner) 3 as the exposure means (exposure portion), so that a light portion potential V1 (electrostatic latent image) of −100 V is formed on the photosensitive drum 1. That is, by a contrast between the dark portion potential Vd and the light portion potential V1, the electrostatic latent image (latent image) including a non-image portion which is a portion of the dark portion potential Vd and an image portion which is a portion of the light portion potential V1 is formed on the photosensitive drum 1. Here, a position where the irradiation of the photosensitive drum 1 with light by the exposure device 3 is carried out with respect to the rotational direction of the photosensitive drum 1 is an exposure position P2.

The electrostatic latent image formed on the photosensitive drum 1 is moved to a developing portion G by rotation of the photosensitive drum 1. To a timing when a leading end of an image forming region (toner image formable region) on the photosensitive drum 1 reaches the developing portion G, application of a developing bias (developing voltage) Vdc of −300 V to the developing roller 41 by a developing power source (high-voltage power source) E2 (FIG. 3) as a developing voltage applying portion is started. In this embodiment, when the rotational drive of the developing roller 41 is started, substantially at the same time, the application of the developing bias to the developing roller 41 is started. Then, by a potential difference between the light portion potential V1 of the surface of the photosensitive drum 1 and the potential of the developing bias, the toner is supplied from the developing roller 41 to the image portion for the electrostatic latent image on the photosensitive drum 1. By this, the electrostatic latent image on the photosensitive drum 1 is developed (visualized), so that a toner image (developer image) is formed on the photosensitive drum 1. Further, to the supplying roller 42, a supplying bias (supply voltage) of −400 V is applied by a supplying power source (high-voltage power source) E3. In this embodiment, when the application of the developing bias is started, substantially at the same time, the application of the supplying bias is started. Then, by a potential difference between the potential of the developing bias and the potential of the supplying bias, the toner is supplied from the supplying roller 42 to the developing roller 41. Thus, during the developing step, to the developing roller 41, the developing bias of which polarity is the same as the normal charge polarity of the toner and of which potential is between the dark portion potential Vd and the light portion potential V1 of the surface of the photosensitive drum 1 is applied. Further, during the developing step, to the supplying roller 42, the supplying bias of which polarity is the same as the normal charge polarity of the toner and which is larger in absolute value than the developing bias is applied. The toner in the developing container 44 is supplied to the surface of the developing roller 41 by the supplying roller 42, and a triboelectric charge is imparted to the toner by the regulating blade 43, so that a toner layer is formed on the surface of the developing roller 41. Then, the toner on the developing roller 41 is deposited on the electrostatic latent image on the photosensitive drum 1 in the developing portion G, so that the toner image is formed. In this embodiment, the toner charged to the same polarity as the charge polarity (negative polarity in this embodiment) of the photosensitive drum 1 is deposited on the exposed portion (image portion) on the photosensitive drum 1 where an absolute value of the surface potential is lowered by exposure of the photosensitive drum surface to light after being uniformly charged (reverse development type). In this embodiment, the normal charge polarity of the toner which is a principal charge polarity of the toner during the developing step is the negative polarity. Here, a position (position where the developing roller 41 contacts the photosensitive drum 1) on the photosensitive drum 1 where the toner is supplied from the developing roller with respect to the rotational direction of the photosensitive drum 1 is a developing position P3 and corresponds to a position on the photosensitive drum 1 where the above-described developing portion G is formed.

Figure 3:
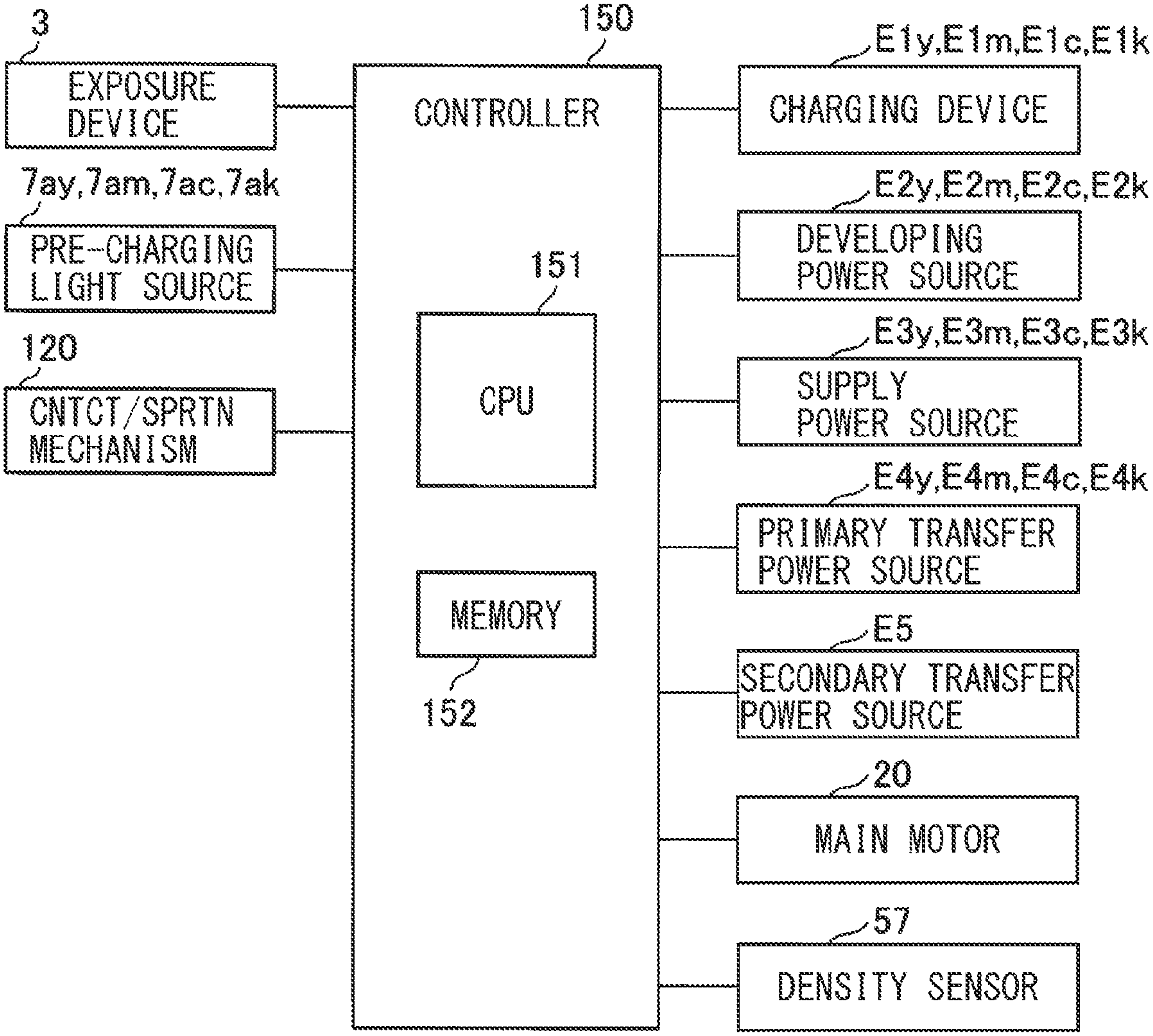
FIG. 3 is a schematic block diagram showing a control mode of a principal part of the image forming apparatus.

The toner image formed on the photosensitive drum 1 is moved to the primary transfer portion N1 by rotation of the photosensitive drum 1. At a timing when a leading end of the image forming region on the photosensitive drum 1 reaches the primary transfer portion N1, application of a primary transfer bias (primary transfer voltage) of +350 V to the primary transfer roller 52 by a primary transfer power source (high-voltage power source) E4 (FIG. 3) as a primary transfer voltage applying portion is started. Then, by a potential difference between the light portion potential V1 of the surface of the photosensitive drum 1 and the potential of the primary transfer bias, the toner image is primary-transferred from the surface of the photosensitive drum 1 onto the surface of the intermediary transfer belt 51 as a toner member (transfer)-receiving member. Thus, in this embodiment, during a primary transfer step, to the primary transfer roller 52, the primary transfer bias (primary transfer voltage) which is a DC voltage of an opposite polarity to the normal charge polarity of the toner is applied by the primary transfer power source E4 (FIG. 3). For example, during full-color image formation, the toner images of yellow, magenta, cyan and black formed on the photosensitive drums 1 are successively primary-transferred superposedly onto the intermediary transfer belt 51. Here, a position (position where the intermediary transfer belt 51 contacts the photosensitive drum 1) where transfer of the toner (image) from the photosensitive drum 1 onto the intermediary transfer belt 51 with respect to the rotational direction is executed is a primary transfer position P4 and corresponds to a position on the photosensitive drum 1 where the above-described primary transfer portion N1 is formed.

The toner image primary-transferred on the intermediary transfer belt 51 is conveyed to the secondary transfer portion N2 by rotation of the intermediary transfer belt 51. The toner image on the intermediary transfer belt 51 is secondary-transferred onto a sheet-like recording material P nipped and conveyed between the intermediary transfer belt 51 and the secondary transfer roller 53 by the action of the secondary transfer roller 53 in the secondary transfer portion N2. During a secondary transfer step, to the secondary transfer roller 53, a secondary transfer bias (secondary transfer voltage) which is a DC voltage of an opposite polarity to the normal charge polarity of the toner is applied by a secondary transfer power source (high-voltage power source) E5 (FIG. 3) as a secondary transfer voltage applying portion. Here, a position (position where the secondary transfer roller 53 contacts the recording material P (intermediary transfer belt 51)) where transfer of the toner (image) from the intermediary transfer belt 51 onto the recording material P is executed is a secondary transfer position and corresponds to a position on the intermediary transfer belt 51 where the above-described secondary transfer portion N2 is formed. The recording material (recording medium, transfer material, sheet) P is conveyed to the secondary transfer portion N2 by being timed to the toner image on the intermediary transfer belt 51 by a feeding (conveying) device (not shown).

The recording material P on which the toner image is secondary-transferred is conveyed to a fixing device 6 as a fixing means.

The fixing device 6 fixes (melts, sticks) the toner image on the recording material P by pressing and heating the recording material P carrying the (unfixed) toner image. The recording material P on which the toner image is fixed is discharged (outputted) to an outside of the apparatus main assembly 110 of the image forming apparatus 100.

On the other hand, the surface potential of the photosensitive drum 1 after the primary transfer step is uniformized to about −200 V to 0 V by the pre-charging exposure device 7. Here, with respect to the rotational direction of the photosensitive drum 1, a position on the photosensitive drum 1 where the photosensitive drum surface is irradiated with light by the pre-charging exposure device 7 is a pre-charging exposure position P5. Further, the toner remaining on the photosensitive drum 1 after the primary transfer step (hereinafter, this toner is referred to as "transfer residual transfer") is charged to the negative polarity by electric discharge between the charging roller 2 and the photosensitive drum 1. Thereafter, the transfer residual toner is collected by the developing roller 41 by a potential difference between the developing roller 41 and the photosensitive drum 1 in the developing portion P4 and then is accommodated in the developing container 44 (hereinafter, this collection is referred to as "development collection"). Specifically, of the transfer residual toner reaching the developing portion G, the transfer residual toner on the non-image portion of the surface of the photosensitive drum 1 is collected by the developing roller 41 by the potential difference between the dark portion potential Vd of the surface of the photosensitive drum 1 and the potential of the developing bias. Further, of the transfer residual toner reaching the developing portion G, the transfer residual toner on the image portion of the surface of the photosensitive drum 1 remains on the photosensitive drum 1 and constitutes the toner image. Thus, the image forming apparatus 100 of this embodiment employs a cleaner-less system (drum cleaner-less system).

Toner remaining on the intermediary transfer belt 51 after the secondary transfer step (hereinafter, this toner is referred to as "secondary transfer residual toner") is removed from the surface of the intermediary transfer belt 51 by the cleaning device 8 and is collected in the cleaning device 8.

The cleaning device 8 includes an elastic cleaning blade 81 contacting the intermediary transfer belt 51 and a cleaning container 82. Further, the cleaning device 8 scrapes off the toner from the rotating intermediary transfer belt 51 by the cleaning blade 81 and accommodates the toner in the cleaning container 82. The cleaning device 8 constitutes the intermediary transfer belt unit 5.

Further, when a whole developing step of the print job (described later) is ended, an operation for separating the developing roller 41 from the photosensitive drum 1 by the contact and separation mechanism 120 (hereinafter, this operation is referred to as a "separating operation") is performed, and the biases applied to the charging roller 2, the developing roller 41, and the supplying roller 42 are cut off. Then, the drive of the main motor 20 is stopped after all the steps of the image forming process such as the secondary transfer step and the fixing step are ended.

2. Toner Density Detecting Means

The image forming apparatus 100 includes a density sensor 57 as an image density detecting means for detecting a toner amount of the toner on the intermediary transfer belt 51 in a position opposing the driving roller 55 through the intermediary transfer belt 51. The density sensor 57 is provided so as to be capable of detecting the toner amount of the toner on the intermediary transfer belt 51 in a detecting position D on a side downstream of the primary transfer portion N1 (the most downstream primary transfer portion N1*k*) and upstream of the secondary transfer portion N2 with respect to the belt feeding direction R2. With respect to the belt feeding direction R2, of the four process cartridges 10, the process cartridge 10*k* for black is positioned closest to the detecting position D. Further, with respect to the belt feeding direction R2, of the four process cartridges 10, the process cartridge 10*y* of yellow is positioned remotest from the detecting position D. The density sensor 57 is constituted by a reflection-type optical sensor including a light emitting element and a light receiving element. Light is emitted from the light emitting element toward the surface of the intermediary transfer belt 51 and reflected light from the surface of the intermediary transfer belt 51 is received by the light receiving element. A light quantity of the reflected light changes depending on the toner amount of the toner on the surface of the intermediary transfer belt 51. A signal depending on the light quantity of the reflected light is outputted from the light receiving element of the density sensor 57 and is sent to a CPU 151 of the controller 150 described later. The density sensor 57 is disposed so that an image forming region (toner image formable region) on the intermediary transfer belt 51 is irradiated with the light from the light emitting element.

That is, the density sensor 57 is a detecting portion for detecting the toner image formed by the developing device 4. In other words, the density sensor 57 outputs a signal depending on the toner image formed by the developing device 4. That is, by using the density sensor 57, it is possible to detect the presence or absence of the toner image transferred on the intermediary transfer belt 51 after being moved from the developing device 4 to the photosensitive drum 1. Incidentally, in this embodiment, the detecting portion detects a toner image for a test pattern on the intermediary transfer member (toner image receiving member), but the present invention is not limited thereto.

For example, the detecting portion may detect the toner image for the test pattern on the photosensitive member and may also detect the toner image for the test pattern on the recording material (toner image receiving member) after the toner image for the test pattern is transferred on the recording material.

3. Contact and Separation Mechanism

Figure 4:
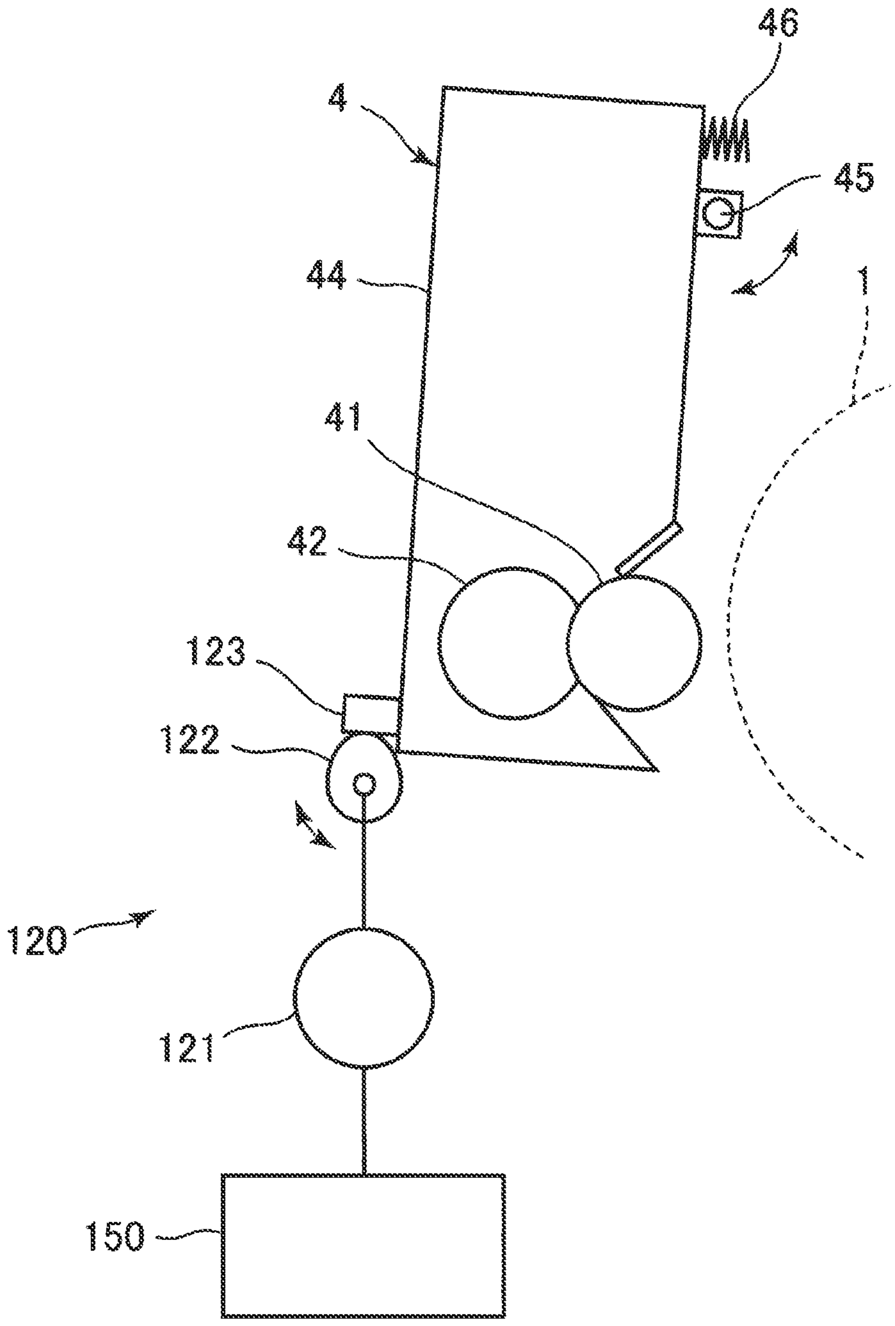
FIG. 4 is a schematic view of a contact and separation mechanism.

The image forming apparatus 100 includes the contact and separation mechanism 120 capable of moving the developing roller 41 to a contact position where the developing roller 41 contacts the photosensitive drum 1 and a separated position where the developing roller 41 is separated from the photosensitive drum 1. FIG. 4 is a schematic view for illustrating the contact and separation mechanism 120 in this embodiment. In this embodiment, the contact and separation mechanism 120 is capable of moving the developing device 4 to the contact position and the separated position. In FIG. 4, as a representative example, a structure of the contact and separation mechanism 120 relating to a single image forming portion S is shown, but other image forming portions S have a similar structure. Further, the structure of a part of the contact and separation mechanism 120 (for example, a contact and separation motor 121 and a moving member 122 (described later)) may be common to all or some of the four image forming portions S.

The developing container 44 of the developing device 4 is fixed to another container (frame) for supporting the photosensitive drum 1 and the charging roller 2 so as to be rotatable (swingable) about a rotation shaft 45 provided substantially in parallel to a rotational axis direction of the photosensitive drum 1. Further, the developing container 44 is urged by an urging member 46 such as a spring so that the developing roller 41 rotatably supported by the developing container 44 is rotated in a direction in which the developing roller 41 contacts the photosensitive drum 1. Further, the contact and separation mechanism 120 includes the contact and separation motor 121 as a driving source, the moving member (cam or the like) 122 driven by the contact and separation motor 121, and a receiving portion 123 on which the moving member 122 acts and which is provided on the developing container 44. The rotational operation of the contact and separation motor 121 is controlled by the controller 150 described later, so that pressing of the moving member 122 against the receiving portion 123 and release of the pressing are executed. By pressing the receiving portion 123 by the moving member 122, the developing container 44 is rotated against an urging force of the urging member 46, so that the developing device 4 can be moved so as to dispose the developing roller 41 in the separated position where the developing roller 41 is separated from the photosensitive drum 1. Further, the pressing of the receiving portion 123 by the moving member 122 is released, rotation of the developing container 44 by the urging force of the urging member 46 is permitted, so that the developing device 4 can be moved so as to dispose the developing roller 41 in the contact position where the developing roller 41 contacts the photosensitive drum 1.

4. Control Mode

FIG. 3 is a schematic block diagram showing a control mode of a principal part of the image forming apparatus 100 of this embodiment. The image forming apparatus 100 includes the controller 150. The controller 150 includes the CPU 151 as a calculation (computation) control means which is a central element for performing arithmetic processing, a memory (storing element) 152 such as a ROM or a RAM as storing means, and an input/output portion (not shown) for controlling exchange of signals between the controller 150 and elements connected thereto. In the RAM, a detection result, a calculation result, and the like of the sensor are stored, and in the ROM, a control program and a data table acquired in advance are stored.

The controller 150 is a control means capable of integrally controlling the operation of the image forming apparatus 100. To the controller 150, respective portions of the image forming apparatus 100 are connected. To the controller 150, for example, the charging power source E1, the developing power source E2, the supplying power source E3, the primary transfer power source E4, the secondary transfer power source E5, the exposure device 3, the main motor 20, the contact and separation mechanism 120, the density sensor 57, a light source 7*a* of the pre-charging exposure device 7, and the like are connected. In this embodiment, each of the charging power source E1, the developing power source E2, the supplying power source E3, the primary power source E4, and the light source 7*a* of the pre-charging exposure device 7 is independently provided for each of the image forming portions S. The controller 150 is capable of executing the image forming operation, a separation abnormality detecting operation described later, and the like by controlling operations (ON/OFF and output values) of the above-described various power source (bias supplying means), operations (ON/OFF and exposure amount) of the exposure device 3, the operation of the contact and separation mechanism 120, the operation of the density sensor 57, operations (ON/OFF and exposure amount) of the light source 7*a* of the pre-charging exposure device 7, and operation timings of the these members.

The image forming apparatus 100 is capable of executing a print job (print operation, printing operation) which is a series of operations which is started by a single start instruction and in which an image or images are formed on a single recording material P or a plurality of recording materials P. In this embodiment, the start instruction is inputted from the external device (not shown) such as the personal computer to the image forming apparatus 100. The print job includes, in general, an image forming step (printing step), a pre-rotation step, a sheet interval step in the case where the images are formed on the plurality of recording materials P, and a post-rotation type. The image forming step is a period in which formation of the electrostatic latent image on the photosensitive drum 1, development of the electrostatic latent image (toner image formation), the primary transfer of the toner image, the secondary transfer of the toner image, the fixing of the toner image, and the like are actually executed, and during image formation refers to this period. Specifically, a timing during the image formation is different depending on positions of execution of the formation of the electrostatic latent image, the toner image formation, the primary transfer of the toner image, the secondary transfer of the toner image, the fixing of the toner image, and the like. The pre-rotation step is a period in which a preparatory operation before the image forming step is performed. The sheet interval step (image interval step) is a period corresponding to an interval between a recording material P and a subsequent recording material P when the image forming step is continuously performed on the plurality of recording materials P (during continuous image formation). The post-rotation step is a period in which a post-operation (preparatory operation) after the image forming step is performed. During non-image formation is a period other than during the image formation and includes the pre-rotation step, the sheet interval step, the post-rotation step, a pre-multi-rotation step which is a preparatory operation during turning-on of a main switch (power source) of the image forming apparatus 100 or during restoration from a sleep state, and the like step. In this embodiment, the image forming apparatus 100 is capable of executing the separation abnormality detecting operation described later during the non-image formation.

5. Separation Abnormality of Developing Roller

In this embodiment, as described above, the developing roller 41 is in the home position where the developing roller 41 is in the separated state from the photosensitive drum 1. Further, roughly, the developing roller 41 is in the contact state with the photosensitive drum 1 during the developing step and is returned to the separated state from the photosensitive drum 1 again after the developing step is ended.

However, there is a possibility that the separating operation is not normally performed and a state in which the developing roller 41 contacts the photosensitive drum 1 at an unintended timing is formed. Further, there is a possibility that the developing roller 41 unintendedly always contacts the photosensitive drum 1. In such a case that abnormality of the separating operation ("separation abnormality") occurred, for example, in a period from a start of the rotational drive of the photosensitive drum 1 to a start of the rotational drive of the developing roller 41, only the photosensitive drum 1 is rotationally driven in the state of contact between the developing roller 41 and the photosensitive drum 1. As a result, friction occurs between the photosensitive drum 1 and the developing roller 41 and a torque required for rotationally driving the photosensitive drum 1 is increased by friction resistance at that time, so that the motor and component parts relating to transmission of the driving force are consumed more than necessary in some instances. In such a situation, when the use of the image forming apparatus 100 is continued and consumption of the above-described parts is repeated more than necessary, there is a possibility that breakage and out of order of the parts are induced. Further, in the case where the separation abnormality occurs, there is a possibility that an operation, such as the above-described refreshing operation, required for separating the developing roller 41 from the photosensitive drum 1 cannot be appropriately performed.

For that reason, in this embodiment, the separation abnormality detecting operation (detecting mode, separation abnormality detecting sequence) is executed for detecting whether or not the separation operation is normally performed (i.e., whether or not the separation abnormality occurs). The image forming apparatus 100 executes the separation abnormality detecting operation during the non-image formation other than the image formation (image forming mode). By this, it is possible to suppress progress of inconveniences due to the separation abnormality.

6. Separation Abnormality Detecting Operation

Figure 5:
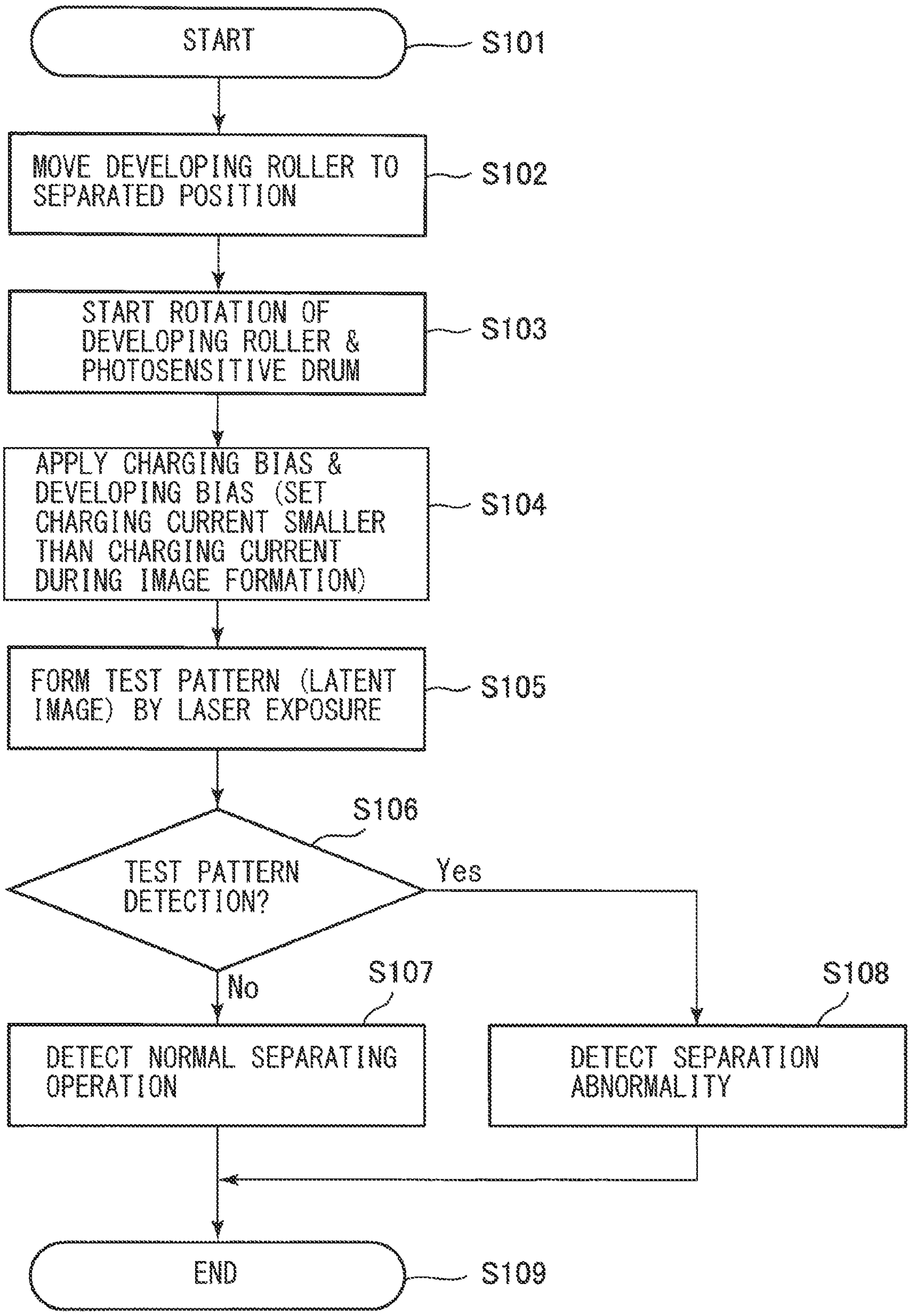
FIG. 5 is a flowchart showing an outline of a procedure of a separation abnormality detecting operation.

Next, a procedure of the separation abnormality detecting operation in this embodiment will be described. FIG. 5 is a flowchart showing an outline of the procedure of the separation abnormality detecting operation in this embodiment. Incidentally, in this embodiment, the separation abnormality detecting operation is executed at a predetermined timing. The timing when the separation abnormality detecting operation is executed will be described in an embodiment described later. Further, in this embodiment, the separation abnormality detecting operation in a single image forming portion S will be described as a representative example. An example of the separation abnormality detecting operation in the plurality of image forming portions S will be described in an embodiment described later.

The controller 150 starts the separation abnormality detecting operation depending on a predetermined start signal (S101). When the separation abnormality detecting operation is started, the controller 150 controls the contact and separation mechanism 120 so as to move the developing roller 41 to the separated position which is the home position (S102). At this time, in the case where the developing roller 41 has already been in the separated position, the developing roller 41 is not necessarily required to be actually moved. Then, the controller 150 not only starts rotations of the photosensitive drum 1, the intermediary transfer belt 51, the developing roller 41, the supplying roller 42, and the like (S103), but also starts application of predetermined biases to the charging roller 2, the developing roller 41, and the supplying roller 42 (S104).

Then, the controller 150 controls the exposure device 3, so that an electrostatic latent image for a predetermined test pattern is formed on the photosensitive drum 1 (S105). Further, in S105 (or S104), before a region of the drive test pattern on the photosensitive drum 1 reaches the primary transfer position P4, application of a drive bias to the primary transfer roller 52 is started. Incidentally, a process condition such as a bias setting during the separation abnormality detecting operation and a surface potential setting of the photosensitive drum 1 will be described later.

Thereafter, the controller 150 discriminates whether or not the toner image for the test pattern is detected by the density sensor 57 (S106). That is, in the case where the electrostatic latent image for the test pattern is not developed in the developing position P3 and thus the toner image for the test pattern is not transferred onto the intermediary transfer belt 51 in the primary transfer position P4, the toner image for the test pattern is not detected in the detecting position D by the density sensor 57. In this case, the controller 150 detects that the separating operation is normally performed (S107), and then ends the separation abnormality detecting operation (S109). On the other hand, in the case where the electrostatic latent image for the test pattern is positioned in the developing position P3 and the toner image for the test pattern is transferred onto the intermediary transfer belt 51 in the primary transfer position P4, the toner image for the test pattern is detected in the detecting position D by the density sensor 57. In this case, the controller 150 detects the separation abnormality, i.e., that the detecting operation is not normally performed and that the developing roller 41 contacts the photosensitive drum 1 (S108), and then ends the separation abnormality detecting operation (S109).

Incidentally, in this embodiment, the case where the separation abnormality detecting operation is executed and a normal separating operation is detected (S107), specifically, the controller 150 performs the cleaning operation described later, and then ends the operation (application of the biases and rotation of the rotatable members) of the image forming apparatus 100. Further, in the case where the separation abnormality is detected (S108), the controller 150 carries out processing, for example, such that a message to the effect that the separation abnormality occurred is notified to an operator such as a user or a service person in a display portion of an operating portion provided on the image forming apparatus 100 or in a display portion on an external device or the like.

In this embodiment, the test pattern is a pattern such that two lateral lines each having a width of 3 mm with respect to a sub-scan direction and extending in a main scan direction and that an interval between the two lateral lines with respect to the sub-scan direction is 3 mm, the electrostatic latent image for the test pattern was formed on the photosensitive drum 1 by controlling the exposure device 3. A length of the test pattern with respect to the main scan direction may be a length of the image forming region substantially over an entire area thereof with respect to the main scan direction and may also be a length of a part of the image forming region corresponding to the detecting position D with respect to the main scan direction. Incidentally, the main scan direction is a direction substantially perpendicular to the movement direction of the surface of the photosensitive drum 1. Further, the sub-scan direction in a direction substantially parallel to the movement direction of the surface of the photosensitive drum 1 and is a direction substantially perpendicular to the main scan direction.

7. Process Condition of Separation Abnormality Detecting Operation

Next, the bias setting and the surface potential setting of the photosensitive drum 1 during the separation abnormality detecting operation in this embodiment will be described.

With a larger charging current flowing between the charging roller and the photosensitive drum during the charging of the surface of the photosensitive drum, the electric discharge product is liable to generate on the surface of the photosensitive drum, and particularly in the constitution employing the cleaner-less system, the electric discharge product is liable to accumulate on the surface of the photosensitive drum 1. When the electric discharge product accumulates on the surface of the photosensitive drum 1, in a high-humidity environment, the electric discharge product lowers in resistance, so that the electrostatic latent image is disturbed in some instances. As a result, the image is disturbed, i.e., a so-called "image flow" occurs in some instances.

On the other hand, during the developing step, the developing roller 41 is contacted to the photosensitive drum 1, and therefore, the electric discharge product on the surface of the photosensitive drum 1 is removed by the surface of the developing roller 41, so that the occurrence of the "image flow" can be suppressed. Particularly, the developing roller 41 is contacted to the photosensitive drum 1 and is rotated relative to the photosensitive drum 1 with a predetermined peripheral speed difference, so that the electric discharge product deposited on the surface of the photosensitive drum 1 is scraped off and thus the occurrence of the "image flow" can be satisfactorily suppressed. However, during the execution of the separation abnormality detecting operation, particularly in the case where the separating operation is normally performed, the developing roller 41 is not contacted to the photosensitive drum 1, and therefore, the electric discharge product accumulates on the surface of the photosensitive drum 1 in some instances.

Therefore, in this embodiment, in order that an accumulation amount of the electric discharge product on the surface of the photosensitive drum in the separation abnormality detecting operation is decreased and that the occurrence of the "image flow" is suppressed, the charging current during the separation abnormality detecting operation is set lower than the charging current during the image formation.

The charging current can be decreased by decreasing the absolute value of the charging bias or the pre-charging exposure amount or by decreasing both the absolute value of the charging bias and the pre-charging exposure amount. In the case where the pre-charging exposure amount is decreased, a potential difference between the surface of the photosensitive drum 1 and the charging roller 2 before the charging becomes small, and therefore, the discharge amount and the charging current are decreased. Incidentally, the exposure amount can be represented by an energy value of the light with which the surface of the photosensitive drum 1 is irradiated for a unit time per a predetermined area, and specifically, can be controlled by adjusting a current supplied to the light source.

In this embodiment, during the separation abnormality detecting operation, the charging bias is set at −900 V, so that an absolute value thereof was made smaller than the charging bias of −1000 V during the image formation. In addition, in this embodiment, during the separation abnormality detecting operation, the pre-charging exposure amount was decreased from the pre-charging exposure amount during the image formation by 25%. Incidentally, the developing bias and the supplying bias during the separation abnormality detecting operation will be described later.

Thus, in this embodiment, by decreasing the charging current in the separation abnormality detecting operation, the accumulation of the electric discharge product on the surface of the photosensitive drum 1 by execution of the separation abnormality detecting operation is suppressed, so that the occurrence of the "image flow" can be suppressed.

8. Drum Cleaning Operation

Next, the drum cleaning operation executed with the separation abnormality detecting operation in this embodiment will be described. Incidentally, in this embodiment, this drum cleaning operation is executed after the separation abnormality detecting operation is ended, but can also be regarded as a part of the separation abnormality detecting operation.

In this embodiment, in the case where the separation abnormality detecting operation is executed and the normal separating operation is detected (S107), the drum cleaning operation such that the photosensitive drum 1 is rotated (idled) in contact with the developing roller 41 is executed, and then, the operation of the image forming apparatus 100 is ended. By this, by the execution of the separation abnormality detecting operation, the electric discharge product which can be deposited on the surface of the photosensitive drum 1 is removed.

As the drum cleaning operation, the following operation is performed. That is, after the separation abnormality detecting operation is executed, the developing roller 41 is contacted to the photosensitive drum 1 by the contact and separation mechanism 120. Then, in a state in which the developing roller 41 is contacted to the photosensitive drum 1, the photosensitive drum 1 may preferably be rotated through at least one full circumference of the photosensitive drum 1. Incidentally, a rotation amount of this photosensitive drum 1 is not limited thereto, but in many cases, the rotation amount is sufficient when the photosensitive drum 1 is rotated through 10 full circumferences or less, and typically 5 full circumferences or less. Thereafter, the developing roller 41 is separated from the photosensitive drum 1 by the contact and separation mechanism 120, and then the operation (bias application, rotation of the rotatable member) of the image forming apparatus 100 is ended. In this embodiment, as the drum cleaning operation, the separation abnormality detecting operation is executed and thereafter, in the state in which the developing roller 41 is contacted to the photosensitive drum 1, an operation for rotating the photosensitive drum 1 through two full circumferences of the photosensitive drum 1 is executed. Incidentally, execution of the drum cleaning operation after the execution of the separation abnormality detecting operation refers to typically a start of the drum cleaning operation by carrying out control so that the developing roller 41 is moved to the contact position after the occurrence or non-occurrence of the separation abnormality is discriminated as being normal. However, immediately after the region of the test pattern on the photosensitive drum 1 in each image forming portion S passes through the developing position P3 (for example, before the detection of the test pattern is detected), the drum cleaning operation may be quickly started by carrying out control so that the developing roller 41 is moved to the contact position.

In this embodiment, the charging bias and the pre-charging exposure amount during the drum cleaning operation was made equal to those during the separation abnormality detecting operation. Incidentally, the developing bias and the supplying bias during the drum cleaning operation will be described later.

Incidentally, a constitution in which the drum cleaning operation is not executed with the execution of the separation abnormality detecting operation may be employed.

9. Setting of Developing Bias and Supplying Bias

Next, the developing bias and the supplying bias during the separation abnormality detecting operation and during the drum cleaning operation will be described.

The developing device 4 in this embodiment includes the supplying roller 42 for supplying the toner to the developing roller 41 in contact with the developing roller 41. Further, by adjusting the supplying bias applied to this supplying roller 42, it is possible to perform adjustment of the toner supply amount of the toner to the developing roller 41.

During the above-described cleaning operation, it is preferable that the toner supply amount of the toner to the developing roller 41 is smaller than that during the image formation. This is because by increasing the frictional force between the photosensitive drum 1 and the developing roller 41 through a decrease in toner amount of the toner on the developing roller 41, scraping-off of the electric discharge product from the surface of the photosensitive drum 1 can be effectively performed.

In this embodiment, not only during the separation abnormality detecting operation but also during the drum cleaning operation, the developing bias was set at −300 V which is the same as the developing bias during the image formation. On the other hand, the supplying bias was set during the separation abnormality detecting operation at −400 V which is the same as the supplying bias during the image formation, but was set during the drum cleaning operation at −350 which is smaller in absolute value than the supplying bias during the image formation.

That is, in this embodiment, the negatively chargeable toner is used as the developer. Further, a bias difference A (=(supplying bias)−(developing bias)) of the supplying roller 42 and the developing roller 41 during the separation abnormality detecting operation is Δ=−100 V which is the same as the ΔV during the image formation. On the other hand, this bias difference Δ during the drum cleaning operation is Δ=−50 V smaller in absolute value than the Δ during the image formation. By providing such a relationship between the supplying bias and the developing bias, during the drum cleaning operation, the toner amount of the toner on the developing roller 41 is decreased, so that the frictional force between the photosensitive drum 1 and the developing roller 41 is increased. For that reason, the scraping-off of the electric discharge product from the surface of the photosensitive drum 1 can be effectively performed. The supplying bias during the drum cleaning operation can be made a bias (0 V, including a potential of an opposite polarity to the normal charge polarity of the toner) of a potential of the opposite polarity to the normal charge polarity of the toner than the supplying belt during the image formation is. However, typically, the supplying bias during the drum cleaning operation is a bias which has the same polarity as the supplying bias during the image formation and which is smaller in absolute value than the supplying bias during the image formation.

Incidentally, in this embodiment, Δ=−100 V which is the bias difference Δ (=(supplying bias)−(developing bias)) for supplying the toner from the supplying roller 42 to the developing roller 41 is set so as to ensure a toner supply amount for obtaining a proper image density.

Further, in the drum cleaning operation, in a state in which a region of the developing roller 41 contacting the supplying roller 42 when the absolute value of the bias difference Δ is changed so as to become small as described above and later is contacted to the photosensitive drum 1, it is preferable that the photosensitive drum 1 is rotated through at least one full circumference. However, in at least a part of a period in which the photosensitive drum 1 is rotated through at least one full circumference in the state in which the developing roller 41 is contacted to the photosensitive drum 1, when the absolute value of the above-described bias difference Δ is changed so as to become small, some effect can be achieved.

Incidentally, a constitution in which the developing bias and the supplying bias during the drum cleaning operation are not changed from those during the separation abnormality detecting operation may be employed.

Thus, in this embodiment, the image forming apparatus 100 includes the rotatable photosensitive drum 1, the charging portion 2 for charging the surface of the photosensitive drum 1, the exposure portion 3 for forming the electrostatic latent image on the photosensitive drum 1 by exposing the charged surface of the photosensitive drum 1 to light, the developing member 41 for forming the toner image by developing the electrostatic latent image on the photosensitive drum 1 with the toner in contact with the surface of the photosensitive drum 1, the transfer device 5 for transferring the toner image from the photosensitive drum 1 onto the toner image receiving member 51 in the transfer portion N1, the contact and separation mechanism 120 for moving the developing member 41 to the contact position where the developing member 41 contacts the surface of the photosensitive drum 1 and the separated position where the developing member 41 is separated from the surface of the photosensitive drum 1, the charging voltage applying portion E1 for applying the charging voltage for charging the charging portion 2 to the charging portion 2, the detecting portion 57 for detecting the toner image on the photosensitive drum 1 or the toner image receiving member, and the controller 150 capable of controlling the contact and separation mechanism 120, the charging voltage applying portion E1, and the exposure portion 3, in which the toner remaining on the photosensitive drum 1 without being transferred onto the toner image receiving member is collected by the developing member 41. Further, in this embodiment, the controller 150 is capable of executing the operation in the image forming mode in which the controller 150 carries out control so that the toner image to be formed on the recording material P as the toner image receiving member or on the recording material P on which the toner image is transferred from the toner image receiving member is formed, and executing the operation in the detecting mode in which the controller 150 carries out control so that the predetermined instruction for positioning the charging member 41 in the separated position is sent to the contact and separation mechanism 120 and the electrostatic latent image for the test pattern is formed on the photosensitive drum 1 and in the case where the developing member 41 is positioned in the contact position without being positioned in the separated position in accordance with the predetermined instruction, the toner image for the test pattern formed by developing the electrostatic latent image for the test pattern is detected by the detecting portion 57. Then, in this embodiment, the controller 150 carries out control so that the charging current flowing through the charging portion 2 during the charging in the operation in the detecting mode becomes lower than the charging current flowing through the charging portion 2 during the charging in the operation in the image forming mode. In this embodiment, the controller 150 carries out control so that the absolute value of the charging voltage in the operation in the detecting mode becomes smaller than the absolute value of the charging voltage in the operation in the image forming mode. Further, in this embodiment, the image forming apparatus 100 includes the pre-charging exposure portion 7 for exposing the surface of the photosensitive drum 1 to light on a side downstream of the transfer portion P4 where the transfer is made and upstream of the charging position P1 where the charging is made with respect to the rotational direction of the photosensitive drum 1, and the controller 150 is capable of controlling the pre-charging exposure portion 7 and carries out control so that the exposure amount of the exposure by the pre-charging exposure portion 7 in the operation in the detecting mode becomes smaller than the exposure amount of the exposure by the pre-charging exposure portion 7 in the operation in the image forming mode. Further, in this embodiment, in the case where the operation in the detecting mode is executed, the controller 150 carries out control so that before the operation in the image forming mode is executed, the developing member 41 is positioned in the contact position by the contact and separation mechanism 120 and the photosensitive member 1 is rotated through at least one full circumference in the state in which the developing member 41 contacts the photosensitive drum 1.

As described above, according to this embodiment, the occurrence of the "image flow" due to the execution of the separation abnormality detecting operation can be suppressed.

Embodiment 2

Next, another embodiment (embodiment 2) of the present invention will be described. Basic constitution and operation of an image forming apparatus according to this embodiment are the same as those of the image forming apparatus of the embodiment 1. Accordingly, in the image forming apparatus of this embodiment, elements having functions or constitutions identical or corresponding to those of the image forming apparatus of the embodiment 1 are represented by the same reference numerals or symbols and will be omitted from detailed description.

In the embodiment 1, the countermeasure against the "image flow" which is the problem due to the execution of the separation abnormality detecting operation was described. In this embodiment, a countermeasure against the "color mixing" due to the "re-transfer" which is another problem due to the execution of the separation abnormality detecting operation will be described.

In the image forming apparatus 100 of this embodiment which is the tandem-type image forming apparatus of the intermediary transfer type, the toner images of different colors are formed in the four image forming portions S, respectively. Then, these toner images are primary-transferred onto the intermediary transfer belt 51, so that a state in which the toners of the four colors are appropriately present in mixture on the intermediary transfer belt 51 is formed.

For example, in parallel to the primary transfer of the toner image of yellow onto the intermediary transfer belt 51 in the image forming portion Sy for yellow, the toner image of magenta is formed on the photosensitive drum 1*m* in the image forming portion Sm for magenta. Thereafter, the toner image of yellow on the intermediary transfer belt 51 is conveyed to the primary transfer portion N1*m* of the image forming portion Sm for magenta by rotation of the intermediary transfer belt 51. Further, primary transfer is carried out so that the toner image of magenta is superposed on the toner image of yellow on the intermediary transfer belt 51. By this, a toner image of a secondary color in which the toner of magenta is superposed on the toner of yellow is formed on the intermediary transfer belt 51. This toner image of the secondary transfer is secondary-transferred onto the recording material P and is fixed on the recording material P, so that a red image is outputted in this case.

Further, in the image forming process as described above, a phenomenon which is called "re-transfer" occurs in some cases. This phenomenon is a phenomenon such that the toner (image) primary-transferred onto the intermediary transfer belt 51 in the image forming portion S on an upstream side of the belt feeding direction R2 is moved to the photosensitive drum 1 in the primary transfer portion N1 of the image forming portion S on a downstream side of the belt feeding direction R2. For example, in the case of the above-described red image, the toner of yellow and the toner of magenta which are primary-transferred on the intermediary transfer belt 51, particularly the upper toner of magenta superposed on the toner of yellow is moved to the photosensitive drums 1*c* and 1*k* of the image forming portions Sc and Sk for cyan and black positioned downstream of the image forming portion Sm with respect to the belt feeding direction R2 in some instances.

In the constitution employing the cleaner-less system, similarly as in the case of the transfer residual toner described in the embodiment 1, the re-transferred toner ("re-transfer toner") is moved to the developing portion G by rotation of the photosensitive drum 1. Then, this retransfer toner is collected on the developing member 41 by the potential difference between the developing roller 41 and the photosensitive drum 1 similarly as in the case of the transfer residual toner.

Here, the re-transfer toner is different from the transfer residual toner and is toner of another color moved from another image forming portion S. When this toner of another color is collected on the developing roller 41, on the surface of the developing roller 41 and in the developing device 4, a state in which the toners of the plurality of colors are mixed with each other (color-mixed state) is formed. In the case where the image formation is carried out while keeping this color-mixed state, an image of color deviated from an originally assumed color (tint) is formed. For that reason, in the constitution employing the cleaner-less system, it is important that the color-mixed state due to the re-transfer is suppressed.

2. Surface Potential of Photosensitive Drum and Applied Bias

Next, using FIG. 6, an influence of a relationship (potential difference) between the surface potential of the photosensitive drum 1 and the applied bias at each of the above-described potions will be described.

Part (a) of FIG. 6 is a graph showing a relationship between a re-transfer toner amount and a potential difference in the primary-transfer portion N1. In this figure, an increasing value of the ordinate represents that the re-transfer toner amount increases. Further, in the figure, the abscissa represents an absolute value (|Vd−Vt|: simply referred to as a potential difference) of a difference (Vd−Vt) between the dark portion potential Vd of the surface of the photosensitive drum 1 and the primary transfer bias Vt. That is, the graph shows that with a larger value of the abscissa, the potential difference between the dark portion potential Vd and the primary transfer bias Vt is larger. As described above, the dark portion potential Vd is a value higher than the primary transfer bias Vt on the negative polarity side. For that reason, a condition such that the toner including a negative electric charge is attracted to the intermediary transfer belt 51 easier with the larger potential difference between the dark portion potential Vd and the primary transfer bias Vt, i.e., with the larger value of the abscissa is formed. Conversely, a condition such that the toner including a positive electric charge is attracted to the photosensitive drum 1 easier with the larger value of the abscissa is formed.

Here, the toner images on the photosensitive drum 1 and the intermediary transfer belt 51 are constituted principally by the toners charged to the negative polarity. However, the electric charges of the toners are not uniform and are distributed with a predetermined deviation. For that reason, in the toner image on the intermediary transfer belt 51, the toner charged to the positive polarity slightly exists. For that reason, as shown in part (a) of FIG. 6, when the potential difference (|Vd−Vt|) between the dark portion potential Vd and the primary transfer bias Vt becomes larger, of the toner image on the intermediary transfer belt 51, particularly the toner charged to the positive polarity is attracted to the photosensitive drum 1 easier, so that the re-transfer toner increases. Conversely, in order to reduce the re-transfer toner, it is desirable that the potential difference between the dark portion potential Vd and the primary transfer bias Vt is made small.

On the other hand, when the surface potential of the photosensitive drum 1 and the value of the primary transfer bias Vt are set, there is another factor. This will be described using part (b) of FIG. 6.

Part (b) of FIG. 6 is a graph showing a relationship between a transfer residual toner amount and a potential difference in the primary-transfer portion N1. In this figure, an increasing value of the ordinate represents that the transfer residual toner amount increases. Further, in the figure, the abscissa represents an absolute value (|V1−Vt|: simply referred to as a potential difference) of a difference (V1−Vt) between the light portion potential V1 of the surface of the photosensitive drum 1 and the primary transfer bias Vt. That is, the graph shows that with a larger value of the abscissa, the potential difference between the dark portion potential Vd and the primary transfer bias Vt is larger. Incidentally, in the same figure, a plot of a broken line shows the case of the primary color, and a plot of a solid line shows the case of the secondary color. Incidentally, the case of the secondary color is the case where the toner image for the second color is primary-transferred superposedly onto the toner image which has already been primary-transferred on the upstream side of the belt feeding direction. Further, the case of the primary color is the case where the toner image is directly primary-transferred onto the surface of the intermediary transfer belt 51.

Similarly as in the case of the above-described re-transfer toner amount, the light portion potential V1 is a value higher than the primary transfer bias Vt on the negative polarity side. For that reason, a condition such that the toner including a negative electric charge is attracted to the intermediary transfer belt 51 easier with the larger potential difference between the light portion potential V1 and the primary transfer bias Vt, i.e., with the larger value of the abscissa is formed. As described above, the toner of the toner image on the photosensitive drum 1 is basically charged to the negative polarity. For that reason, as shown in part (b) of FIG. 6, as the potential difference (|V1−Vt|) between the light portion potential V1 and the primary transfer bias Vt is made larger, the toner image on the photosensitive drum 1 is attracted to the intermediary transfer belt 51 easier, so that the transfer residual toner can be decreased.

Here, as shown in part (b) of FIG. 6, the transfer residual toner amount becomes larger at the same potential difference (|V1−Vt|) in the case of the secondary color than in the case of the primary color. In other words, the potential difference (|V1−Vt|) so that the transfer residual toner amount is below a predetermined transfer residual toner amount indicated by a chain line becomes larger in the case of the secondary color than in the case of the primary color. This is for the following reason. That is, in the image forming portion S on the downstream side of the belt feeding direction R2, the toner image is primary-transferred onto the intermediary transfer belt 51, so that the secondary color toner image is formed. At that time, a part of a current flowing through between the photosensitive drum 1 and the intermediary transfer belt 51 flows into the toner which has already been primary-transferred onto the intermediary transfer belt 51 on the upstream side of the belt feeding direction R2. By this, the toner image on the photosensitive drum 1 is less attracted to the intermediary transfer belt 51.

Incidentally, it is general that the primary transfer bias Vt is applied substantially uniformly without being finely fluctuated with respect to the rotational axis direction of the primary transfer roller 52. It may be possible that a current gradient is provided with respect to the rotational axis direction by providing a gradient for a diameter, an electric resistance, contact pressure, and the like of the primary transfer roller 52. However, in general, it is difficult that the primary transfer bias Vt is finely fluctuated with respect to the rotational axis direction of the primary transfer roller 52. For that reason, it is desirable that irrespective of image information, i.e., whether the color is the primary color or the secondary color, the primary transfer bias Vt is set so as to satisfy a desired performance in the case of the secondary color for which the transfer residual toner amount increases more than in the case of the primary color.

Further, it is also important that an image quality can be maintained even in a state in which the transfer residual toner increased. This will be described using part (c) of FIG. 6.

Part (c) of FIG. 6 is a graph showing a relationship between a collected developer amount and a potential difference in the developing portion G. In this figure, an increasing value of the ordinate represents that the toner in a larger amount can be collected by the development collection. Further, in the figure, the abscissa represents an absolute value (|Vd−Vt|: simply referred to as a potential difference) of a difference (Vd-Vdc) between the dark portion potential Vd of the surface of the photosensitive drum 1 and the developing bias Vdc. That is, the graph shows that with a larger value of the abscissa, the potential difference between the dark portion potential Vd and the developing bias Vdc is larger.

Similarly as in the cases of the above-described retransfer amount and the transfer residual toner amount, the dark portion potential Vd is a value higher than the developing bias Vdc on the negative polarity side. For that reason, a condition such that the toner including a negative electric charge is attracted to the developing roller 41 easier, that is, such toner is collected easier by the development collection, with the larger potential difference between the dark portion potential Vd and the developing bias Vdc, i.e., with the larger value of the abscissa is formed. As described in the embodiment 1, the transfer residual toner is charged to the negative polarity by the electric discharge between the charging roller 2 and the photosensitive drum 1. That is, the toner carried and conveyed to the developing portion G by the photosensitive drum 1 is charged to the negative polarity. For that reason, as shown in part (c) of FIG. 6. The collected developer amount increases with a larger potential difference (|Vd−Vdc|) between the dark portion potential Vd and the developing bias Vdc.

In the case where the development collection of the transfer residue toner is not sufficiently carried out, a part of the toner on the photosensitive drum 1 passes through the developing portion G and is conveyed to the primary transfer portion N1. Then, the toner which is not collected by the development collection and which includes the negative electric charge is primary-transferred onto the intermediary transfer belt 51. By this, an image defect which is called "ghost" such that the toner image which should not be originally formed is formed occurs in a position delayed from a predetermined electrostatic latent image position by a distance corresponding to one full circumference. For that reason, so as to sufficiently permit the execution of the development collection, the potential difference (|Vd−Vdc|) between the dark portion potential Vd and the developing bias Vdc may desirably be set.

Here, as described above, particularly in the case of the secondary color, a transfer residual toner increases in some instances. In that case, in order to sufficiently collect the transfer residual toner by the development collection to a level such that the ghost is not problematic, there is a need to increase the potential difference (|Vd−Vdc|) between the dark portion potential Vd and the developing bias Vdc than in the case of the primary color. This will be further described. Chain lines of part (c) of FIG. 6 show transfer residual toner amounts of the toners which are assumed to reach the developing portion G. As described above, the assumed transfer residual toner amount changes depending on whether the color is the primary color or the secondary color. As shown in part (c) of FIG. 6, the assumed transfer residual toner amount in the case of the secondary color is larger than the assumed transfer residual toner amount in the case of the primary color. That is, the toner amount of the toner which should be collected becomes larger in the case of the secondary color than in the case of the primary color. For that reason, when the potential difference (|Vd−Vdc|) between the dark portion potential Vd and the developing bias Vdc is set so that the ghost is not problematic, a potential difference V2 in the case of the secondary color is required to be made larger than a potential difference V1 in the case of the primary color.

Incidentally, with respect to the circumferential direction and the rotational axis direction of the photosensitive drum 1, it is not desirable that depending on whether the color is the primary color or the secondary color, the potential difference (|Vd−Vdc|) between the dark portion potential Vd and the developing bias Vdc after rotation of the photosensitive drum 1 through one full circumference is changed. Different from the case of the above-described primary transfer bias Vt, it is not difficult that a fine potential difference is formed on the surface of the photosensitive drum 1 with respect to the circumferential direction and the rotational axis direction. After the surface potential of the photosensitive drum 1 is uniformized to the predetermined dark portion potential Vd by the control of the charging bias, weak laser light is emitted to a predetermined position of the photosensitive drum surface by the control of the exposure device 3, whereby it is possible to change the surface potential for each of positions of the photosensitive drum 1 with respect to the circumferential direction and the rotational axis direction. However, when the potential difference between the dark portion potential Vd and the developing bias Vdc changes, a size of a minute dot and a thickness of a thin line fluctuate. In that case, as described above, a difference in density and line width is generated between a portion where the weak laser light is emitted and a portion where the weak laser light is not emitted. For that reason, it is not desirable that the dark portion potential Vd is changed for each of the positions of the photosensitive drum 1 with respect to the circumferential direction and the rotational axis direction. Accordingly, similarly as in the case of the above-described transfer potential Vt, it is desirable that irrespective of the image information, i.e., whether the color is the primary color or the secondary color, the dark portion potential Vd is set so that the ghost is prevented from occurring for the secondary color so that the toner in a larger amount is collected by the development collection.

From these, it is desirable that during the normal image formation, on assumption of the secondary color having a tendency that the transfer residual toner amount increases, the surface potential of the photosensitive drum 1 and the values of the applying biases of the respective portions are set. For that reason, during the normal image formation, in order to reduce the re-transfer amount, the potential difference between the dark portion potential Vd and the primary transfer bias Vt is not specialized so as to be made small, but is required to be optimized while taking an overall balance into consideration.

3. Separation Abnormality Detecting Operation

Next, a procedure of the separation abnormality detecting operation in this embodiment will be described. FIG. 7 is a timing chart for illustrating the procedure of the separation abnormality detecting operation in this embodiment. In this embodiment, the controller 150 executes the separation abnormality detecting operation by controlling respective portions of the image forming apparatus 100 in accordance with the timing chart shown in FIG. 7. Similarly as described above in the embodiment 1, the controller 150 starts the separation abnormality detecting operation depending on a predetermined start signal. Incidentally, in this embodiment, the separation abnormality detecting operation is executed at a predetermined timing. The timing when the separation abnormality detecting operation is executed will be described in an embodiment described later.

In this embodiment, the controller 150 carries out control so that in the separation abnormality detecting operation, the color of the toner image for the test pattern formed on the intermediary transfer belt 51 becomes the primary color. By this, it is possible to realize a bias setting put emphasis on the decrease in re-transfer amount, not a bias setting in which the secondary color is assumed as described above.

First, drive of the main motor 20 is started, in synchronization with the four image forming portions S, rotations of the photosensitive drum 1, the intermediary transfer belt 51, the developing roller 41, and the supplying roller 42 (not shown in FIG. 7) being started. Further, substantially at the same time as the start timings of the drive of the above-described members, application of the charging bias to the charging roller 2, application of the developing bias to the developing roller 41, and application of the supplying bias to the supplying roller 42 are started.

Then, in this embodiment, as a pre-stage in which the separation abnormality detecting operation is performed, in order to enhance detection accuracy of the test pattern by the density sensor 57, a belt cleaning operation and a calibration operation of the density sensor 57 are performed.

First, in a period of Tcl, the belt cleaning operation, in which the drive of the intermediary transfer belt 51 is continued while the density sensor 57 is kept turned off ("OFF") is performed. This belt cleaning operation is performed for suppressing that intensity of a detection signal of the density sensor 57 becomes a value different from an assumed value in the case where the surface of the intermediary transfer belt 51 is contaminated with the toner, dirt, or the like. In the belt cleaning operation, drive of the intermediary transfer belt 51 is continued as described above, so that the surface of the intermediary transfer belt 51 is cleaned by the cleaning device 8. The time Tcl may preferably be set at not less than a time when a position on the intermediary transfer belt 51 contacted to the cleaning blade 81 at least at a stationary time of the intermediary transfer belt 51 is moved to the detecting position D of the density sensor 57.

Thereafter, during a time Tca, a calibration operation in which the drive of the intermediary transfer belt 51 is continued in the state in which the density sensor 57 is turned on ("ON") is performed. That is, reflected light in a state in which the toner does not substantially exist on the surface of the intermediary transfer belt 51 is received by the density sensor 57. The surface of the intermediary transfer belt 51 is gradually abraded by continuously using the image forming apparatus 100, so that minute unevenness is formed. For that reason, in the state in which the toner does not substantially exist on the surface of the intermediary transfer belt 51, the intensity of the reflected light detected by the density sensor 57 changes depending on a use status of the image forming apparatus 100. Further, in some cases, the light emitting element and the light receiving element of the density sensor 57 are gradually contaminated with the dirt or the like and the intensity of the detection signal changes. Against these cases, the calibration operation is performed, and information for estimating a reference value of the intensity of the reflected light detected by the density sensor 57 is acquired. The time Tca may preferably be at least a time in which the intermediary transfer belt 51 is moved by a distance corresponding to one full circumference of the intermediary transfer belt 51.

Then, after the calibration operation, the separation abnormality detecting operation is executed in the following manner.

First, during a time Te, the photosensitive drum 1 is irradiated with the laser light by the exposure device 3, so that the electrostatic latent image for the test pattern is formed in a region on the photosensitive drum 1 with a width Le with respect to the rotational direction (sub-scan direction). At that time, in this embodiment, the exposure is carried out substantially at the same time in the four image forming portions Sy, Sm, Sc and Sk, so that the electrostatic latent images for test patterns are formed substantially at the same time in the four image forming portions Sy, Sm, Sc and Sk. As described above, the developing bias is applied to the developing roller 41, and therefore, in the case where the developing roller 41 contacts the photosensitive drum 1, the negatively chargeable toner is moved and deposited on the photosensitive drum 1, so that the toner image for the test pattern is formed on the surface of the photosensitive drum 1.

That is, the control is continued from the above-described belt cleaning operation and the above-described calibration operation and is carried out so as to form a state in which the developing roller 41 and the photosensitive drum 1 are separated from each other. For that reason, in the case where the separating operation is normally performed, as described above, even when the developing bias is applied, the toner is not moved from the developing roller 41 to the photosensitive drum 1. On the other hand, in the case where a state in which the separating operation is not normally performed and the developing roller 41 contacts the photosensitive drum 1 is formed, as described above, by application of the developing bias to the developing roller 41, the toner is moved from the developing roller 41 to the photosensitive drum 1 and thus the toner image for the test pattern is formed on the surface of the photosensitive drum 1.

Further, in this embodiment, substantially at the same time as formation of the electrostatic latent images for test patterns, application of the primary transfer biases Vt is started in the image forming portions Sy, Sm, Sc and Sk. By this, in the case where the toner image for the test pattern is formed on the surface of the photosensitive drum 1, the toner image is transferred onto the intermediary transfer belt 51 and then is conveyed to the detecting position D of the density sensor 57 with rotation of the intermediary transfer belt 51.

In the separation abnormality detecting operation, in the case where the toner image for the test pattern is not formed on the surface of the intermediary transfer belt 51, i.e., in the case where the toner image for the test pattern is not detected by the density sensor 57, the controller 150 discriminates that the developing roller 41 is normally separated from the photosensitive drum 1. On the other hand, in the separation abnormality detecting operation, in the case where the toner image for the test pattern is detected by the density sensor 57, the controller 150 discriminates that the toner image which is not to be formed if the developing roller 41 is in a normal state is formed and thus discriminates that the developing roller 41 causes separation abnormality.

Here, the separation abnormality detecting operation using the density sensor 57 will be further described. FIG. 8 is a timing chart in which a timing of the execution of the separation abnormality detecting operation by the density sensor 57 in the timing chart of FIG. 7 is shown in an enlarged manner. The detected signal shown in FIG. 8 shows the detected signal of the density sensor 57 in the separation abnormality detecting operation in the case where all the four image forming portions S cause the separation abnormality FIG. 9 is a schematic sectional view showing a state of the image forming apparatus 100 at a timing of a time T1 in FIG. 8.

As shown in FIG. 9, the photosensitive drums 1 (rotation center positions) of the image forming portions S are disposed substantially equidistantly with widths of inter-image forming portion distances Ls with respect to the belt feeding direction R2. In other words, the inter-image forming portion distance Ls is a distance between adjacent primary transfer portions N1 (adjacent center positions) of the (adjacent) image forming portions S with respect to the belt feeding direction. Further, in this embodiment, the occurrence of the separation abnormality of all the four image forming portions S is assumed, and therefore, on the intermediary transfer belt 51, each of the toner images T for the test patterns transferred from the four photosensitive drums 1 of the four image forming portions S is formed with a width Le' with respect to the belt feeding direction R2. Incidentally, in this embodiment, a predetermined peripheral speed difference is provided between the peripheral speed of the photosensitive drum 1 and the peripheral speed of the intermediary transfer belt 51. For that reason, the toner image formed with the width Le on the photosensitive drum 1 is deformed to the toner image with the width Le' on the intermediary transfer belt 51 due to a peripheral speed ratio between the photosensitive drum 1 and the intermediary transfer belt 51.

In this embodiment, as described above, the test patterns are formed substantially at the same time by performing the exposure substantially at the same time in the four image forming portions S. Of the four image forming portions S, the image forming portion Sk for black is disposed in a position closest to the density sensor 57. For that reason, as shown in FIG. 8, the toner image for the test pattern formed in the image forming portion Sk reaches the detecting position D in a shortest time Tk. Thereafter, with times Tc, Tm and Ty, the toner images for the test patterns formed in the image forming portions Sc, Sm and Sy for cyan, magenta and yellow, respectively, reach the detecting position D successively. When the toner image for the test pattern reaches the detecting position D, the intensity of the detected signal of the density sensor 57 changes. The controller 150 discriminates that the toner image for the test pattern was detected in the case where the intensity of the detected signal of the density sensor 57 exceeds a predetermined detection threshold set in advance as indicated by a chain line in FIG. 8.

Here, in this embodiment, as described above, setting is made so that the color of the toner image for the test pattern on the intermediary transfer belt 51 becomes the primary color. Specifically, as shown in FIG. 9, an exposure time during the formation of the electrostatic latent image for the test pattern is set so that the width Le' of the toner image for the test pattern with respect to the belt feeding direction R2 is smaller than the inter-image forming portion Ls. By this, the controller is capable of discriminating whether or not which one of the four image forming portions S caused the separation abnormality, on the basis of a timing when the intensity of the detected signal of the density sensor 57 exceeds the above-described detection threshold.

Further, in this embodiment, the color of the toner image for the test pattern on the intermediary transfer belt 51 is limited to the primary color, so that there is no need to make the bias setting in which the secondary color is assumed as described above and thus it is possible to make the bias setting in which an emphasis is put on the decrease in re-transfer toner amount. This will be further described using FIG. 10. Parts (a) to (c) of FIG. 10 are schematic views each showing values of the surface potentials of the photosensitive drum and application biases of the respective portions. Part (a) of FIG. 10 shows the values during the image formation, part (b) of FIG. 10 shows the values during the separation abnormality detecting operation in this embodiment, and part (c) of FIG. 10 shows the values during the separation abnormality detecting operation in a modified embodiment of this embodiment.

In this embodiment, as shown in part (b) of FIG. 10, during the separation abnormality detecting operation, the developing bias Vdc is −300 V which is the same value as the value during the image formation shown in part (a) of FIG. 10. Further, in this embodiment, as shown in part (b) of FIG. 10, the light portion potential V1 of the surface of the photosensitive drum 1 is −100 V which is the same as the value during the image formation shown in part (a) of FIG. 10. On the other hand, in this embodiment, as shown in part (b) of FIG. 10, during the separation abnormality detecting operation, a charging bias Vpri is −950 V which is lower in absolute value than the value during the image formation shown in part (c) of FIG. 10. By this, during the separation abnormality detecting operation, the dark portion potential Vd of the surface of the photosensitive drum 1 becomes −450 V which is lower in absolute value than the value during the image formation. Further, in this embodiment, as shown in part (b) of FIG. 10, during the separation abnormality detecting operation, the primary transfer bias Vt is +300 V which is a value (lower in absolute value in this embodiment) close to the light portion potential V1 than the value during the image formation shown in part (a) of FIG. 10 is.

In this embodiment, in the separation abnormality detecting operation, setting is made so that the color of the toner image for the test pattern is the primary color (not the secondary color). For that reason, there is no need that the potential difference (|Vd−Vdc|) between the dark portion potential Vd and the developing bias Vdc is made a large value at which the collected developer amount in the case of the secondary color is assumed. Further, also, as regards the potential difference (|V1−Vt|) between the light portion potential V1 and the primary transfer bias Vt, there is no need that the potential difference is made a large value at which the collected developer amount in the case of the secondary color is assumed. By this, during the separation abnormality detecting operation, there is no problem even when the potential difference between the dark portion potential Vd and the primary transfer bias Vt is made smaller than that during the image formation in order to decrease the re-transfer toner amount.

Part (c) of FIG. 10 shows a setting during the separation abnormality detecting operation in the modified embodiment of this embodiment.

In this embodiment, as shown in part (b) of FIG. 10, the light portion potential V1 of the test pattern formed by the exposure during the separation abnormality detecting operation was −100 V. On the other hand, in the embodiment shown in part (c) of FIG. 10, this light portion potential V1 is −150 V higher in absolute value than the value in this embodiment.

Further, in this embodiment, the primary transfer bias Vt during the separation abnormality detecting operation was +300 V. On the other hand, in the embodiment shown in part (c) of FIG. 10, this primary transfer bias Vt is +250 V (lower in absolute value in this embodiment) closer to the light portion potential V1 than the value in this embodiment is. On the other hand, in the embodiment of part (c) of FIG. 10, the developing bias Vdc during the separation abnormality detecting operation is −300 V which is the same as that in this embodiment and which is the same as that during the image formation.

When the potential difference between the developing bias Vdc and the light portion potential V1 changes, the toner amount of the toner moved from the developing roller 41 to the photosensitive drum 1, by extension to a density of an image to be outputted changes. Here, the potential difference between the developing bias Vdc and the light portion potential V1 is an absolute value (|V1−Vdc|) of the difference (V1−Vdc) between the light portion potential V1 and the developing bias Vdc (this difference is simply referred to as the potential difference). For that reason, in order to stabilize the density of the image to be outputted, the potential difference between the developing bias Vdc and the light portion potential V1 should be strictly controlled. On the other hand, in the separation abnormality detecting operation, there is no need that the toner amount to be detected is strictly controlled. Setting should be made so that the development is executed with a minimum toner amount which can be detected by the density sensor 57. However, there is no need to set the potential difference between the light portion potential V1 and the primary transfer bias Vt at the same value as the value during the image formation. For that reason, when the potential difference between the light portion potential V1 and the primary transfer bias Vt is only set at a value at which the transfer residual toner amount is minimum, correspondingly to an increase in absolute value of the light portion potential V1, it is acceptable that the primary transfer bias Vt is changed to the value close to the light portion potential V1. At that time, the primary transfer bias Vt has the opposite polarity to the polarity during the image formation. By this, the potential difference between the dark portion potential Vd and the primary transfer bias Vt can be made smaller. As a result, the re-transfer toner amount can be further decreased.

Incidentally, in this embodiment, both the dark portion potential Vd and the primary transfer bias Vt during the separation abnormality detecting operation were changed from the values during the image formation. On the other hand, only either one of the dark portion potential Vd and the primary transfer bias Vt during the separation abnormality detecting operation may be changed from the values during the image formation.

However, by making the absolute value of the charging bias during the separation abnormality detecting operation smaller than the absolute value of the charging bias during the image formation, an effect of decreasing the accumulation amount of the electric discharge product by decreasing the charging current during the separation abnormality detecting operation as described in the embodiment 1 is obtained. From this viewpoint, similarly as in the embodiment 1, it may be performed that the pre-charging exposure amount during the separation abnormality detecting operation is made smaller than the pre-charging exposure amount during the image formation. Incidentally, as described in the embodiment 1, the decrease in absolute value of the charging bias and the decrease in pre-charging exposure amount may be performed both or either one thereof. However, from the viewpoint of suppressing the “re-transfer” due to the execution of the separation abnormality detecting operation described in the embodiment 1, both of those do not need to be executed.

Further, in this embodiment, the decrease in absolute value of the charging bias was made as a means for decreasing the absolute value of the dark portion potential Vd. On the other hand, the non-image portion (portion where the electrostatic latent image is not formed) of the surface of the photosensitive drum 1 is also irradiated with the weak laser light from the exposure device 3, so that the absolute value of the dark portion potential Vd can be made smaller than the absolute value during the image formation. Further, in the case where this slight exposure is executed also during the image formation, this slight exposure is made stronger during the separation abnormality detecting operation than during the image formation, so that the absolute value of the dark portion potential Vd can be made lower than the absolute value during the image formation. That is, there is a constitution in which in the non-image portion (non-toner image forming portion) of the surface of the photosensitive drum 1, the exposure device (laser scanner) 3 is caused to minutely emit the laser light to the extent such that deposit of excessive toner on the photosensitive drum 1 is not caused and thus background exposure for optimizing the potential of the photosensitive drum 1 is performed. In this case, as the exposure device 3, the laser scanner capable of simultaneously performing the background exposure (weak exposure, first output) and normal exposure (second output) for the image formation with each other can be used. Further, a background exposure amount during the separation abnormality detecting operation may be made larger than a value thereof during the image formation.

Further, in this embodiment, as a means for making the color of the toner image on the intermediary transfer belt 51 the primary color, the exposure time was adjusted and thus a width of the test pattern, with respect to the belt feeding direction R2, which is formed in each of the image forming portions S was made smaller than the inter image forming portion distance Ls. On the other hand, the control may also be carried out so that for example, the test patterns formed in the image forming portions S do not overlap with each other by deviating the exposure times from each other in the image forming portions S. Further, for example, the test patterns formed in the image forming portions S may be shifted from each other in the rotational axis direction of the photosensitive drum 1.

Even in these cases, the toner image of the secondary color is not formed on the intermediary transfer belt 51 in the separation abnormality detecting operation, and therefore, in order to decrease the re-transfer toner amount, the potential difference between the dark portion potential Vd and the primary transfer bias Vt can be made smaller than the potential difference during the image formation.

Further, in this embodiment, in the separation abnormality detecting operation, control was carried out so that the developing roller 41 is always separated from the photosensitive drum 1. On the other hand, in a period of a part of the separation abnormality detecting operation, control may also be carried out so that the developing roller 41 is contacted to the photosensitive drum 1. For example, the developing roller 41 may be contacted to the photosensitive drum 1 during passing of the electrostatic latent image for the test pattern, formed on the photosensitive drum 1 by the exposure device 3, through the developing portion G. In this case, a deviation of a time when the developing roller 41 is contacted to the photosensitive drum 1 may be discriminated from the width of the toner image for the test pattern formed, i.e., a length of a time when the detected signal of the density sensor 57 exceeds a predetermined detection threshold. However, in order to perform the original separation abnormality detecting operation, there is a need to carry out the following control. That is, even when a time lag of the contact operation is taken into consideration, in a state in which it is assumed that the developing roller 41 is separated from the photosensitive drum 1 when the separation abnormality detecting operation is normal, control is carried out so that at least a part of the electrostatic latent image for the test pattern passes through the developing portion G.

Further, the detection threshold of the density sensor 57 in the separation abnormality detecting operation may be a preset value or a value in which a result of the above-described calibration operation is reflected. Specifically, for example, a value obtained by subjecting a predetermined correction value to addition to or multiplication by a representative value, such as an average, a maximum, or a minimum, of the intensity of the detected signal of the density sensor 57 during the calibration operation may be used as the detection threshold. Further, at that time, the above-described correction value may be appropriately changed depending on a use history, a use environment, or the like of the image forming apparatus 100 or the process cartridge 10. As the use history of the above-described image forming apparatus 100, it is possible to cite a print number of sheets (the number of sheets subjected to the image formation), a use amount (rotation time, the number of rotations), and the like of the intermediary transfer belt 51. Further, as the use history of the above-described process cartridge 10, it is possible to cite the print number of sheets, a use amount (rotation time or the number of rotations of the developing roller 41) of the developing device 4, and the like. Further, the above-described use environment may be at least one of a temperature and a humidity in at least one of an inside and an outside of the image forming apparatus 100. Further, the above-described correction value may be appropriately set for each image forming portion S, i.e., for each color of the toner.

Further, in the case where the surface of the intermediary transfer belt 51 is scanned or the like, when the density sensor 57 detects large noise during the calibration operation, control may be carried out so as to remove the noise. Specifically, for example, a phase at which the noise generates is recorded, and then a pulse at that phase may be removed. Further, by averaging a signal along a time axis, the noise may be removed by smoothing.

Further, in this embodiment, the belt cleaning operation and the calibration operation were executed in the case where the separation abnormality detecting operation is performed, but these operations may only be required to be executed as needed, and either one or both of these operations do not need to be executed.

Further, in this embodiment, the dark portion potential Vd and the test pattern during the separation abnormality detecting operation are set equally (uniformly) with respect to the rotational axis direction (longitudinal direction) of the photosensitive drum 1. On the other hand, in the case where the test pattern is formed at a part of the photosensitive drum 1 with respect to the rotational axis direction, for example, in a region of 50 mm which is a part of the image forming region with respect to the rotational axis direction, the following is preferred.

For example, it is preferable that the dark portion potential Vd is decreased by adjustment of the laser exposure (amount) to the extent that contamination or the like of the charging roller 2 does not occur in a remaining non-image portion where the test pattern is not formed with respect to the rotational axis direction of the photosensitive drum 1. By this, it is possible to not only suppress the "color mixing" due to the re-transfer or the like in another image forming portion S but also suppress the occurrence of the "image flow" due to the electric discharge product in the region where the test pattern is not formed.

Further, in this embodiment, description was omitted, but in this embodiment, with execution of the separation abnormality detecting operation, it is possible to execute the drum cleaning operation described in the embodiment 1.

Further, in the most upstream image forming portion Sy with respect to the rotational direction of the intermediary transfer belt 51, the problem due to the re-transfer does not occur substantially. For that reason, in the image forming portions Sm, Sc and Sk other than the most upstream image forming portion Sy with respect to the rotational direction of the intermediary transfer belt 51, a process condition in the separation abnormality detecting operation can be set as described above in this embodiment. In this case, in the most upstream image forming portion Sy with respect to the rotational direction of the intermediary transfer belt 51, for example, the process condition described in the embodiment 1 can be employed. However, from the viewpoint of ease of control of the separation abnormality detecting operation (for example, setting of the detection threshold of the test pattern for each color), process conditions of the separation abnormality detecting operations in all the image forming portions S can be made substantially the same. In this embodiment, in all the image forming portions S, the process conditions of the separation abnormality detecting operations were made substantially the same.

Thus, in this embodiment, the image forming apparatus 100 includes first and second image forming portions (for example, the image forming portions Sy and Sm or the process cartridges 10*y* and 10*m*). In this embodiment, with respect to the rotational direction of the intermediary transfer member 51, the photosensitive member 1*m* of the second image forming portion Sm is positioned downstream of the photosensitive member 1*y* of the first image forming portion Sy and upstream of the secondary transfer portion N2. Further, in this embodiment, the controller 150 is capable of executing the operation in the image forming mode and the operation in the detecting mode. In this embodiment, in the operation in the detecting mode, the transfer voltage is applied to the transfer portion N1 when the region of the test pattern on the surface of the photosensitive member 1 contacts the intermediary transfer member 51 in each of the first and second image forming portions. Further, in this embodiment, in the operation in the detecting mode, when the region of the test pattern on the surface of the photosensitive member 1 of the first image forming portion is a first region, the region of the test pattern on the surface of the photosensitive member 1 of the second image forming portion is a second region, a region on the surface of the intermediary transfer member 51 contacting the first region is a third region, and a region on the surface of the intermediary transfer member 51 contacting the second region is a fourth region, the controller 150 carries out control so that the third region and the fourth region do not overlap with each other. Further, in this embodiment, in the second image forming portion, the controller 150 carries out control so that an absolute value of the difference between the potential of the non-image portion on the photosensitive member 1 and the potential of the transfer voltage in the operation in the detecting mode is smaller than an absolute value of the difference between the potential of the non-image portion on the photosensitive member 1 and the potential of the transfer voltage in the operation in the image forming mode. In this embodiment, in the second image forming portion, the controller 150 carries out control so that the value of the transfer voltage in the operation in the detecting mode is closer to the potential of the image portion on the photosensitive member 1 than the value of the transfer voltage in the operation in the image forming mode is. Further, in this embodiment, in the second image forming portion, the controller 150 carries out control so that an absolute value of the difference between the potential of the image portion on the photosensitive member 1 and the potential of the developing voltage in the operation in the detecting mode is smaller than an absolute value of the difference between the potential of the image portion on the photosensitive member 1 and the potential of the developing voltage in the operation in the image forming mode.

In this case, in the second image forming portion, the controller 150 is capable of carrying out control so that an absolute value of the potential of the image portion on the photosensitive member 1 in the operation in the detecting mode is larger than an absolute value of the potential of the image portion on the photosensitive member 1 in the operation in the image forming mode. Further, in this embodiment, the controller 150 carries out control so that with respect to the rotational direction of the intermediary transfer member 51, each of a length of the above-described third region and a length of the above-described fourth region is smaller than a distance between the transfer portion N1 of the first image forming portion and the transfer portion N1 of the second image forming portion.

As described above, according to this embodiment, the occurrence of the "color mixing" due to the execution of the separation abnormality detecting operation can be suppressed.

Embodiment 3

Next, another embodiment (embodiment 3) of the present invention will be described. Basic constitution and operation of an image forming apparatus according to this embodiment are the same as those of the image forming apparatus of the embodiment 1. Accordingly, in the image forming apparatus of this embodiment, elements having functions or constitutions identical or corresponding to those of the image forming apparatus of the embodiment 1 are represented by the same reference numerals or symbols and will be omitted from detailed description.

In this embodiment, a timing when the separation abnormality detecting operation is performed will be described. That is, the controller 150 outputs a start signal of the separation abnormality detecting operation described in the embodiments 1 and 2 and then executes the separation abnormality detecting operation depending on this start signal. Incidentally, a timing of executing the separation abnormality detecting operation described in this embodiment is applicable to the image forming apparatuses 100 of the embodiments 1 and 2, and a constitution for setting this timing described in this embodiment may be provided in the image forming apparatuses 100 of the embodiments 1 and 2.

FIG. 11 is a schematic block diagram showing a control mode of a principal part of the image forming apparatus 100 of this embodiment. In this embodiment, a process cartridge 10 of which printable sheet number of 5000 sheets on a print ratio 5% basis was used. Further, in this embodiment, the image forming apparatus 100 includes, as an environment detecting means (environment detecting portion) for detecting a use environment of the image forming apparatus 100, a temperature and humidity sensor 11 for detecting a temperature and a humidity on an inside of the image forming apparatus 100. The use environment (environmental information) may be at least one of the temperature and the humidity on at least one of an inside and an outside of the image forming apparatus 100. The controller 150 acquires an ambient absolute water content on the basis of a detection result of the temperature and the humidity by the temperature and humidity sensor 11. Further, in this embodiment, each process cartridge 10 includes a cartridge memory 12 constituted by a non-volatile memory or the like as a storing portion (storing device) for storing use history information of the process cartridge 10. In a state in which each process cartridge 10 is mounted in the apparatus main assembly 110, the controller 150 is capable of reading and writing information from and in the cartridge memory 12 of the associated process cartridge 10 through a reading and writing means (not shown) provided in the apparatus main assembly 110.

For example, when the separation abnormality detecting operation is performed before image formation in every print job, a time required for the print job becomes long, thus leading to a cause of a lowering in productivity. For that reason, the separation abnormality detecting operation may preferably be performed at an appropriate timing particularly desired for suppressing progress of inconvenience due to the separation abnormality.

First, execution of the separation abnormality detecting operation is effective during turning-on of the power source of the apparatus main assembly 110, particularly during initial setting. By this, it is possible to detect a defective process cartridge 10 and a defective image forming portion S, so that an influence on, for example, another image forming portion S can be made small.

In this embodiment, the image forming apparatus 100 exposes the separation abnormality detecting operation during each of initial installation of the apparatus main assembly 110 (for example, during an initial operation when the image forming apparatus 100 is installed in an installation place and then is first actuated) and the turning-on of the apparatus main assembly 110. Further, in this embodiment, the image forming apparatus 100 executes the separation abnormality detecting operation on the basis of the information in the cartridge memory 12 of the process cartridge 10 mounted in the apparatus main assembly 110 in the case where detection that the process cartridge 10 is in an initial use (brand-new) state. By this, initial failure of the process cartridge 10 can be detected, so that the influence on another image forming portion S can be made small, for example.

Incidentally, the controller 150 is capable of detecting whether or not the corresponding process cartridge 10 is in the initial use (brand-new) state, on the basis of whether the predetermined information is stored or not stored in the cartridge memory 12. For example, with use of the process cartridge 10, the controller 150 is capable of writing the use history information described in the cartridge memory 12. The use history information may be arbitrary information correlating with a user amount of the process cartridge 10, and it is possible to cite a print number of sheets, the number of rotations and a rotation time of the developing roller 41, a use amount and a remaining amount of the toner, the number of rotations and a rotation time of the photosensitive drum 1, the number of rotations and a rotation time of the charging roller 2, a charging time, and the like. Accordingly, the controller 150 is capable of discriminating that the process cartridge 10 is in the initial use (brand-new) state in the case where the use history information is not stored in the cartridge memory 12 or information corresponding to use amount smaller than a predetermined threshold. Information directly indicating whether or not the process cartridge 10 is in the initial use (brand-new) state may be stored in the cartridge memory 12. Thus, the cartridge memory 12 constitutes not only the storing portion for storing the use history of the process cartridge 10 but also a new article detecting portion for the process cartridge 10.

Next, the separation abnormality detecting operation is effective when executed depending on the use environment (temperature, humidity, or the like) of the image forming apparatus 100 and the use history of the process cartridge 10. The separation abnormality detecting operation is executed at a timing, when the image defect is liable to occur in the cleaner-less system, such as the latter half of a lifetime of the process cartridge 10 or a predetermined use environment of the process cartridge 10, so that the influence on another image forming apparatus S, for example, with the above-described image defect can be made small. As the image defect, it is possible to cite image defect due to an increase in re-transfer toner amount or transfer residual toner amount. The charging state of the toner is changed depending on the use history (deterioration of the toner or the member) and the use environment of the process cartridge 10, whereby the re-transfer toner amount or the transfer residual toner amount increases in some instances. In a situation in which the re-transfer toner amount or the transfer residual toner amount increases, the toner amount of the toner deposited on the charging roller 2 (and an auxiliary charging member in the case where this member is further provided) increases. For that reason, in such a situation, for example, periodical execution of the above-described refreshing operation during the non-image formation becomes important for maintaining an image quality in some instances. The refreshing operation is an operation such that the toner deposited on the charging roller 2 or the like is discharged on the photosensitive drum 1 and then is transferred and collected from the photosensitive drum 1 onto the intermediary transfer belt 51. During this refreshing operation, in order that the toner discharged from the charging roller 2 or the like onto the photosensitive drum 1 is not collected by the developing device 4, there is a need that the developing roller 41 is separated from the photosensitive drum 1. Accordingly, it is preferable that the separation abnormality detecting operation is performed at the above-described timing when the re-transfer toner amount or the transfer residual toner amount increases.

In this embodiment, the image forming apparatus 100 executes the separation abnormality detecting operation in the case where a high temperature/high humidity environment (for example, 30° C./80% RH) is detected by the temperature and humidity sensor 11 and the use history of the process cartridge 10 becomes a predetermined use history. This predetermined use history is after printing of each of 3500 sheets and 4500 sheets. The controller 150 discriminate that the environment is the high temperature/high humidity environment in the case where the ambient absolute water content acquired on the basis of the temperature and the humidity detected by the temperature and humidity sensor 11 exceeds a predetermined threshold. Incidentally, the above-described print number of sheets is an example of a timing when the re-transfer toner amount is liable to increase, acquired by conducting an evaluation test in two-sheet intermittent printing with a print ratio of 5% in the high temperature/high humidity environment. Incidentally, the two-sheet intermittent printing is an operation in which a print job for continuously forming images on two recording materials P is intermittently repeated. By executing the separation abnormality detecting operation at the above-described timing, the separation abnormality can be detected before a timing when the degree of the re-transfer is worsened, so that the influence on another image forming portion S can be made small, for example.

Further, in this embodiment, the image forming apparatus 100 executes the separation abnormality detecting operation in the case where a low temperature/low humidity environment (for example, 15° C./10% RH) is detected by the temperature and humidity sensor 11 and the use history of the process cartridge 10 becomes a predetermined use history. This predetermined use history is after printing of each of 3000 sheets, 4000 sheets, and 5000 sheets. The controller 150 discriminates that the environment is the low temperature/low humidity environment in the case where the ambient absolute water content acquired on the basis of the temperature and the humidity detected by the temperature and humidity sensor 11 is less than a predetermined threshold. Incidentally, the above-described print number of sheets is an example of a timing when the transfer residual toner amount is liable to increase, acquired by conducting an evaluation test in the two-sheet intermittent printing with a print ratio of 5% in the low temperature/low humidity environment. By executing the separation abnormality detecting operation at the above-described timing, the separation abnormality can be detected before a timing when the degree of the remaining transfer residual toner is worsened, so that the influence on another image forming portion S can be made small, for example.

Incidentally, in the case where execution or non-execution of the separation abnormality detecting operation is discriminated on the basis of the use history (including whether or not the state is the initial use state) of the process cartridge 10, the following operation can be performed. That is, the separation abnormality detecting operation can be executed for all the image forming portions S in the case where the process cartridge 10 of either one of the plurality of process cartridges 10 satisfies a condition. Or, the separation abnormality detecting operation may be executed for only the image forming portion S corresponding to the process cartridge 10 satisfying the condition.

Thus, in this embodiment, the image forming apparatus 100 includes the environment detecting portion 11 for detecting the environmental information which is information on at least one of the temperature and the humidity, and the controller 150 executes the operation in the detecting mode in the case where the environmental information detected by the environment detecting portion 11 satisfies the predetermined condition. Further, in this embodiment, the image forming apparatus 100 includes the storing portion 12 for storing the use history information on the use history of the image forming apparatus 100 or the element of the image forming apparatus 100, and the controller 150 executes the operation in the detecting mode in the case where the use history information stored in the storing portion 12 satisfies the predetermined condition. Further, in this embodiment, in the case where the initial operation after the installation of the image forming apparatus 100 is executed, the controller 150 executes the operation in the detecting mode before the execution of the operation in the image forming mode. Further, in this embodiment, in the case where the power source of the image forming apparatus 100 is turned on, the controller 150 executes the operation in the detecting mode before the execution of the operation in the image forming mode. Further, in this embodiment, as regards the image forming apparatus 100, the cartridge 10 including at least one of the photosensitive drum 1 and the developing member 41 is mountable in and dismountable from the apparatus main assembly 110 of the image forming apparatus 100, and the image forming apparatus 100 includes the new article detecting portion 12 for detecting that the new (fresh) cartridge 10 is mounted in the apparatus main assembly 110. In the case where the new article detecting portion 12 detected that the new cartridge 10 is mounted in the apparatus main assembly 110, the controller 150 executes the operation in the detecting mode before the execution of the operation in the image forming mode.

As described above, the present invention was described based on the specific embodiments, but the present invention is not limited to the above-described embodiments.

In the above-described embodiments, the image forming apparatus of the intermediary transfer type in which the toner image formed on the photosensitive member is primary-transferred onto the intermediary transfer member and then is secondary-transferred onto the recording material was described as an example. On the other hand, there is an image forming apparatus of a direct transfer type in which the recording material is conveyed by a recording material carrying member such as a conveying belt and then the toner image is directly transferred from the photosensitive member onto the recording material on the recording material carrying member. The image forming apparatus of the direct transfer type corresponds to a constitution in which the recording material carrying member is provided instead of the intermediary transfer member in the image forming apparatus of the intermediary transfer type and in which instead of the transfer of the toner (image) onto the intermediary transfer member, the toner image is transferred onto the recording material on the recording material carrying member or on the recording material carrying member. Description of the image forming apparatus of the direct transfer type, particularly, description of the separation abnormality detecting operation or the like, may reference0 the description of the above-described embodiments by reading the intermediary transfer member as the recording material carrying member. The present invention is also applicable to such an image forming apparatus of the direct transfer type, so that an effect similar to those of the above-described embodiments is achieved.

Further, in the above-described embodiments, the photosensitive member was a rotatable drum-like member, but may also be an endless belt-like member supported by a plurality of supporting rollers.

Dimensions, materials, shapes, and relative arrangement of constituent elements described in the above-described embodiments should be appropriately changed depending on constitutions and various conditions of apparatus or devices to which the present invention is applicable, and the scope of the present invention is not intended to be limited to the above-described embodiments. For example, the number and arrangement of the image forming portions (process cartridges) are not limited to those in the above-described embodiments, but may be appropriately set as desired. Further, numerical values of the biases or the like applied to the respective members in the above-described embodiments are examples and are not limited to those values, but may be appropriately set as desired.

Further, the present invention is also applicable to a monochromatic image forming apparatus in which a single image forming portion including a photosensitive member is provided and in which a black (single color) image is formed. In this embodiment, for example, by applying the process condition in the separation abnormality detecting operation described in the embodiment 1, the occurrence of the image flow due to the execution of the separation abnormality detecting operation can be suppressed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-188232 filed on Nov. 18, 2021, which is hereby incorporated by reference herein in its entirety.

What is claimed is:

1. An image forming apparatus comprising:

a rotatable photosensitive member;

a charging portion configured to electrically charge a surface of the photosensitive member;

an exposure portion configured to expose the charged surface of the photosensitive member to light to form an electrostatic latent image on the photosensitive member;

a developing member configured to develop the electrostatic latent image on the photosensitive member with toner into a toner image in contact with the surface of the photosensitive member;

a transfer unit configured to transfer the toner image from the photosensitive member onto a toner image receiving member in a transfer portion;

a contact and separation portion configured to move the developing member to a contact position where the developing member contacts the surface of the photosensitive member and a separated position where the developing member is separated from the surface of the photosensitive member;

a charging voltage applying portion configured to apply, to the charging portion, a charging voltage for charging the photosensitive member;

a detecting portion configured to detect the toner image, formed on the photosensitive member, on the photosensitive member or the toner image receiving member; and a controller capable of controlling the contact and separation portion, the charging voltage applying portion, and the exposure portion, wherein toner remaining on the photosensitive member without being transferred onto the toner image receiving member is collected by the developing member, wherein the controller is capable of executing:

an operation in an image forming mode in which the controller carries out control so that the toner image to be formed on a recording material as the toner image receiving member or a recording material onto which the toner image is transferred from the toner image receiving member is formed, and an operation in a detecting mode in which the controller carries out control so that a predetermined instruction to position the developing member in the separated position is sent to the contact and separation portion and an electrostatic latent image for a test pattern is formed on the photosensitive member and then so that in a case that the developing member is positioned in the contact position in accordance with the predetermined instruction without being positioned in the separated position, a toner image for the test pattern formed by developing the electrostatic latent image for the test pattern with toner is detected by the detecting portion, and wherein the controller carries out control so that a charging current flowing through the charging portion during charging of the photosensitive member in the operation in the detecting mode is lower than a charging current flowing through the charging portion during charging of the photosensitive member in the operation in the image forming mode.

2. The image forming apparatus according to claim 1, wherein said controller carries out control so that an absolute value of the charging voltage in the operation in the detecting mode is lower than an absolute value of the charging voltage in the operation in the image forming mode.

3. The image forming apparatus according to claim 1, further comprising a pre-charging exposure portion configured to expose the surface of the photosensitive member to light on a side downstream of a transfer position where transfer is executed and upstream of a charging position where the charging is executed with respect to a rotational direction of the photosensitive member, wherein the controller is capable of controlling the pre-charging exposure portion and carries out control so that an exposure amount by the pre-charging exposure portion in the operation in the detecting mode is less than an exposure amount by the pre-charging exposure portion in the operation in the image forming mode.

4. The image forming apparatus according to claim 1, wherein in a case that the operation in the image forming mode is executed, the controller carries out control so that before the operation in the image forming mode is executed, the developing member is positioned in the contact position by the contact and separation mechanism and then the photosensitive member is rotated at least one full turn in a state in which the developing member contacts the photosensitive member.

5. The image forming apparatus according to claim 1, further comprising an environment detecting portion configured to detect environmental information which is information on at least one of a temperature and a humidity, wherein the controller carries out control so as to execute the operation in the detecting mode in a case that the environmental information detected by the environment detecting portion satisfies a predetermined condition.

6. The image forming apparatus according to claim 1, further comprising a storing portion configured to store use history information on use history of the image forming apparatus or an element of the image forming apparatus, wherein the controller carries out control so as to execute the operation in the detecting mode in a case that the use history information stored in the storing portion satisfies a predetermined condition.

7. The image forming apparatus according to claim 1, wherein in a case that an initial operation of the image forming apparatus after the image forming apparatus is installed is executed, the controller carries out control so as to execute the operation in the detecting mode before executing the operation in the image forming mode.

8. The image forming apparatus according to claim 1, wherein in a case that a power source of the image forming apparatus is turned on, the controller carries out control so as to execute the operation in the detecting mode before executing the operation in the image forming mode.

9. The image forming apparatus according to claim 1, further comprising:

a cartridge including at least one of the photosensitive member and the developing member and capable of being detachably mountable to a main assembly of the image forming apparatus; and a new article detecting portion configured to detect that a new cartridge is mounted in the main assembly of the image forming apparatus, wherein in a case that the new article detecting portion detects that the new cartridge is mounted in the main assembly, the controller carries out control so as to execute the operation in the detecting mode before executing the operation in the image forming mode.

10. An image forming apparatus comprising:

first and second image forming portions each including a rotatable photosensitive member, a charging portion configured to electrically charge a surface of the photosensitive member, and a developing member configured to develop an electrostatic latent image on the photosensitive member with toner into a toner image in contact with a surface of the photosensitive member;

an exposure portion configured to expose the charged surface of the photosensitive member of each of the first and second image forming portions to light to form the electrostatic latent image on the photosensitive member of each of the first and second image forming portions;

an intermediary transfer member which is configured to form a transfer portion in contact with the surface of the photosensitive member of each of the first and second image forming portions and to convey the toner image transferred from the photosensitive member in the transfer portion of each of the first and second image forming portions, for being secondary-transferred onto a recording material in a secondary transfer portion and which is rotatable in a predetermined rotational direction;

a contact and separation portion configured to move the developing member of each of the first and second image forming portions to a contact position in which the developing member contacts the surface of the photosensitive member of each of the first and second image forming portions and a separated position where the developing member is separated from the surface of the photosensitive member of each of the first and second image forming portions;

a charging voltage applying portion configured to apply, to the charging portion of each of the first and second image forming portions, a charging voltage for charging the photosensitive member;

a transfer voltage applying portion configured to apply, to the transfer portion of each of the first and second image forming portions, a transfer voltage for transferring the toner image from the photosensitive member;

a detecting portion configured to detect the toner image, formed on the photosensitive member, on the photosensitive member or the intermediary transfer member; and a controller capable of controlling the contact and separation portion, the charging voltage applying portion, the transfer voltage applying portion, and the exposure portion, wherein toner remaining on the photosensitive member without being transferred onto the intermediary transfer member is collected by the developing member, and with respect to the rotational direction, the photosensitive member of the second image forming portion is positioned downstream of the first image forming portion and upstream of the secondary transfer portion, wherein the controller is capable of executing:

an operation in an image forming mode in which the controller carries out control so that the toner image to be formed on the recording material in each of the first and second image forming portions is formed, and an operation in a detecting mode in which the controller carries out control so that a predetermined instruction to position the developing member in the separated position is sent to the contact and separation portion in each of the first and second image forming portions and an electrostatic latent image for a test pattern is formed on the photosensitive member in each of the first and second image forming portions and then so that in a case that the developing member in at least one of the first and second image forming portions is positioned in the contact position in accordance with the predetermined instruction without being positioned in the separated position under application of the transfer voltage to the transfer portion when a region of the test pattern on the surface of the photosensitive member contacts the intermediary transfer member in each of the first and second image forming portions, a toner image for the test pattern formed by developing the electrostatic latent image for the test pattern with toner is detected by the detecting portion, wherein in the operation in the detecting mode, the region of the test pattern on the surface of the photosensitive member of the first image forming portion is defined as a first region, the region of the test pattern on the surface of the photosensitive member of the second image forming portion is defined as a second region, a region on a surface of the intermediary transfer member contacting the first region is defined as a third region, and a region on the surface of the intermediary transfer member contacting the second region is defined as a fourth region, wherein the controller carries out control so that the third region and the fourth region do not overlap with each other, and wherein the controller carries out control so that in the second image forming portion, an absolute value of a difference between a potential of a non-image portion on the photosensitive member and a potential of the transfer voltage in the operation in the detecting mode is lower than a value of a difference between a potential of the non-image portion on the photosensitive member and a potential of the transfer voltage in the operation in the image forming mode.

11. The image forming apparatus according to claim 10, wherein in the second image forming portion, the controller carries out control so that a charging current flowing through the charging portion during charging in the operation in the detecting mode is lower than a charging current flowing through the charging portion during the charging in the operation in the image forming mode.

12. The image forming apparatus according to claim 11, wherein in the second image forming portion, the controller carries out control so that an absolute value of the charging voltage in the operation in the detecting mode is lower than an absolute value of the charging voltage in the operation in the image forming mode.

13. The image forming apparatus according to claim 10, wherein in the second image forming portion, the controller carries out control so that a value of the transfer voltage in the operation in the detecting mode is closer to a potential of an image portion of the photosensitive member than a value of the transfer voltage in the operation in the image forming mode is.

14. The image forming apparatus according to claim 10, further comprising a developing voltage applying portion configured to apply, to the developing member of each of the first and second image forming portions, a developing voltage for developing the electrostatic latent image, wherein in the second image forming portion, the controller carries out control so that an absolute value of a difference between a potential of an image portion on the photosensitive member and a potential of the developing voltage in the operation in the detecting mode is lower than an absolute value of a difference between a potential of the image portion on the photosensitive member and a potential of the developing voltage in the operation in the image forming mode.

15. The image forming apparatus according to claim 14, wherein in the second image forming portion, the controller carries out control so that an absolute value of the potential of the image portion on the photosensitive member in the operation in the detecting mode is greater than an absolute value of the image portion on the photosensitive member in the operation in the image forming mode.

16. The image forming apparatus according to claim 10, wherein the controller carries out control so that with respect to the rotational direction, each of a length of the third region and a length of the fourth region is shorter than a distance between the transfer portion of the first image forming portion and the transfer portion of the second image forming portion.

17. The image forming apparatus according to claim 10, wherein each of the first and second image forming portions further comprises a pre-charging exposure portion configured to expose the surface of the photosensitive member to light on a side downstream of a transfer position where transfer is executed and upstream of a charging position where the charging is executed with respect to a rotational direction of the photosensitive member, wherein the controller is capable of controlling the pre-charging exposure portion and carries out control in the second image forming portion so that an exposure amount by the pre-charging exposure portion in the operation in the detecting mode is less than an exposure amount by the pre-charging exposure portion in the operation in the image forming mode.

18. The image forming apparatus according to claim 10, wherein in a case that the operation in the image forming mode is executed, the controller carries out control so that before the operation in the image forming mode is executed, in each of the first and second image forming portions, the developing member is positioned in the contact position by the contact and separation mechanism and then the photosensitive member is rotated at least one full turn in a state in which the developing member contacts the photosensitive member.

19. An image forming apparatus comprising:

first and second image forming portions each including a rotatable photosensitive member, a charging portion configured to electrically charge a surface of the photosensitive member, and a developing member configured to develop the electrostatic latent image on the photosensitive member with toner into a toner image in contact with a surface of the photosensitive member;

an exposure portion configured to expose the charged surface of the photosensitive member of each of the first and second image forming portions to light to form the electrostatic latent image on the photosensitive member of each of the first and second image forming portions;

a recording material carrying member which is configured to form a transfer portion in contact with the surface of the photosensitive member of each of the first and second image forming portions and to convey the toner image for being transferred from the photosensitive member onto a recording material while carrying the recording material in the transfer portion of each of the first and second image forming portions and which is rotatable in a predetermined rotational direction;

a contact and separation portion configured to move the developing member of each of the first and second image forming portions to a contact position in which the developing member contacts the surface of the photosensitive member of each of the first and second image forming portions and a separated position where the developing member is separated from the surface of the photosensitive member of each of the first and second image forming portions;

a charging voltage applying portion configured to apply, to the charging portion of each of the first and second image forming portions, a charging voltage for charging the photosensitive member;

a transfer voltage applying portion configured to apply, to the transfer portion of each of the first and second image forming portions, a transfer voltage for transferring the toner image from the photosensitive member;

a detecting portion configured to detect the toner image, formed on the photosensitive member, on the photosensitive member or the recording material carrying member; and a controller capable of controlling the contact and separation portion, the charging voltage applying portion, the transfer voltage applying portion, and the exposure portion, wherein toner remaining on the photosensitive member without being transferred onto the recording material is collected by the developing member, and with respect to a movement direction of the recording material conveyed by the recording material carrying member rotating in the rotational direction, the photosensitive member of the second image forming portion is positioned downstream of the first image forming portion and upstream of the secondary transfer portion, wherein the controller is capable of executing:

an operation in an image forming mode in which the controller carries out control so that the toner image to be formed on the recording material in each of the first and second image forming portions is formed, and an operation in a detecting mode in which the controller carries out control so that a predetermined instruction to position the developing member in the separated position is sent to the contact and separation portion in each of the first and second image forming portions and an electrostatic latent image for a test pattern is formed on the photosensitive member in each of the first and second image forming portions and then so that in a case that the developing member in at least one of the first and second image forming portions is positioned in the contact position in accordance with the predetermined instruction without being positioned in the separated position under application of the transfer voltage to the transfer portion when a region of the test pattern on the surface of the photosensitive member contacts the recording material carrying member in each of the first and second image forming portions, a toner image for the test pattern formed by developing the electrostatic latent image for the test pattern with toner is detected by the detecting portion, wherein in the operation in the detecting mode, the region of the test pattern on the surface of the photosensitive member of the first image forming portion is defined as a first region, the region of the test pattern on the surface of the photosensitive member of the second image forming portion is defined as a second region, a region on a surface of the recording material carrying member contacting the first region is defined as a third region, and a region on the surface of the recording material carrying member contacting the second region is defined as a fourth region, wherein the controller carries out control so that the third region and the fourth region do not overlap with each other, and wherein the controller carries out control so that in the second image forming portion, an absolute value of a difference between a potential of a non-image portion on the photosensitive member and a potential of the transfer voltage in the operation in the detecting mode is lower than a value of a difference between a potential of the non-image portion on the photosensitive member and a potential of the transfer voltage in the operation in the image forming mode.

20. The image forming apparatus according to claim 19, wherein in the second image forming portion, the controller carries out control so that a charging current flowing through the charging portion during charging in the operation in the detecting mode is lower than a charging current flowing through the charging portion during the charging in the operation in the image forming mode.

21. The image forming apparatus according to claim 20, wherein in the second image forming portion, the controller carries out control so that an absolute value of the charging voltage in the operation in the detecting mode is lower than an absolute value of the charging voltage in the operation in the image forming mode.

22. The image forming apparatus according to claim 19, wherein in the second image forming portion, the controller carries out control so that a value of the transfer voltage in the operation in the detecting mode is closer to a potential of an image portion of the photosensitive member than a value of the transfer voltage in the operation in the image forming mode is.

23. The image forming apparatus according to claim 19, further comprising:

a developing voltage applying portion configured to apply, to the developing member of each of the first and second image forming portions, a developing voltage for developing the electrostatic latent image, wherein in the second image forming portion, the controller carries out control so that an absolute value of a difference between a potential of an image portion on the photosensitive member and a potential of the developing voltage in the operation in the detecting mode is lower than an absolute value of a difference between a potential of the image portion on the photosensitive member and a potential of the developing voltage in the operation in the image forming mode.

24. The image forming apparatus according to claim 23, wherein in the second image forming portion, the controller carries out control so that an absolute value of the potential of the image portion on the photosensitive member in the operation in the detecting mode is greater than an absolute value of the image portion on the photosensitive member in the operation in the image forming mode.

25. The image forming apparatus according to claim 19, wherein the controller carries out control so that with respect to the rotational direction, each of a length of the third region and a length of the fourth region is shorter than a distance between the transfer portion of the first image forming portion and the transfer portion of the second image forming portion.

26. The image forming apparatus according to claim 19, wherein each of the first and second image forming portions further comprises a pre-charging exposure portion configured to expose the surface of the photosensitive member to light on a side downstream of a transfer position where transfer is executed and upstream of a charging position where the charging is executed with respect to a rotational direction of the photosensitive member, and wherein the controller is capable of controlling the pre-charging exposure portion and carries out control in the second image forming portion so that an exposure amount by the pre-charging exposure portion in the operation in the detecting mode is less than an exposure amount by the pre-charging exposure portion in the operation in the image forming mode.

27. The image forming apparatus according to claim 19, wherein in a case that the operation in the image forming mode is executed, the controller carries out control so that before the operation in the image forming mode is executed, in each of the first and second image forming portions, the developing member is positioned in the contact position by the contact and separation mechanism and then the photosensitive member is rotated at least one full turn in a state in which the developing member contacts the photosensitive member.

* * * * *